(12) United States Patent
Vitthaladevuni et al.

(10) Patent No.: US 12,689,486 B2
(45) Date of Patent: Jul. 21, 2026

(54) LAYER-SPECIFIC ACCURACY FOR CHANNEL STATE FEEDBACK

(71) Applicant: QUALCOMM Incorporated, San Diego, CA (US)

(72) Inventors: Pavan Kumar Vitthaladevuni, San Diego, CA (US); Jay Kumar Sundararajan, San Diego, CA (US); Taesang Yoo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 18/168,790

(22) Filed: Feb. 14, 2023

(65) Prior Publication Data

US 2024/0275557 A1 Aug. 15, 2024

(51) Int. Cl.
*H04L 5/00* (2006.01)
*H04L 69/04* (2022.01)

(52) U.S. Cl.
CPC ............ *H04L 5/0053* (2013.01); *H04L 69/04* (2013.01)

(58) Field of Classification Search
CPC ..... H04L 5/0053; H04L 69/04; H04L 1/0014; H04L 1/0029; H04L 1/003; H04L 1/0026; H04B 7/0626; H04B 7/0452; H04B 7/0417; H04B 7/063; H04B 7/0643; H04B 7/0645; H04B 7/0658
See application file for complete search history.

(56) References Cited

U.S. PATENT DOCUMENTS

| | | | |
|---|---|---|---|
| 2008/0026744 A1 | 1/2008 | Frederiksen et al. | |
| 2025/0016593 A1* | 1/2025 | Narayanan | .......... H04L 25/0254 |
| 2025/0141525 A1* | 5/2025 | Chai | .................... H04B 7/0626 |
| 2025/0158765 A1* | 5/2025 | Echigo | ................... H04L 5/0048 |

FOREIGN PATENT DOCUMENTS

| | | | | |
|---|---|---|---|---|
| WO | WO-2022041196 A1 | | 3/2022 | |
| WO | WO-2024026006 A1 * | | 2/2024 | .......... H04B 7/0626 |

OTHER PUBLICATIONS

International Search Report and Written Opinion—PCT/US2024/011166—ISA/EPO—May 14, 2024 (2300001WO).

* cited by examiner

*Primary Examiner* — Sujoy K Kundu
*Assistant Examiner* — Samuel Dilan Rutnam
(74) *Attorney, Agent, or Firm* — Holland & Hart LLP

(57) ABSTRACT

Methods, systems, and devices for wireless communication are described. A user equipment (UE) may receive signaling from a network entity via a cell. The signaling may indicate a state of resource utilization associated with at least the cell. The UE may modify a compression scheme in accordance with the state of resource utilization. The compression scheme may be used at the UE for compressing channel state information (CSI) associated with a layer used for wireless communication between the UE and the network entity via the cell.

30 Claims, 16 Drawing Sheets

Figure 2:
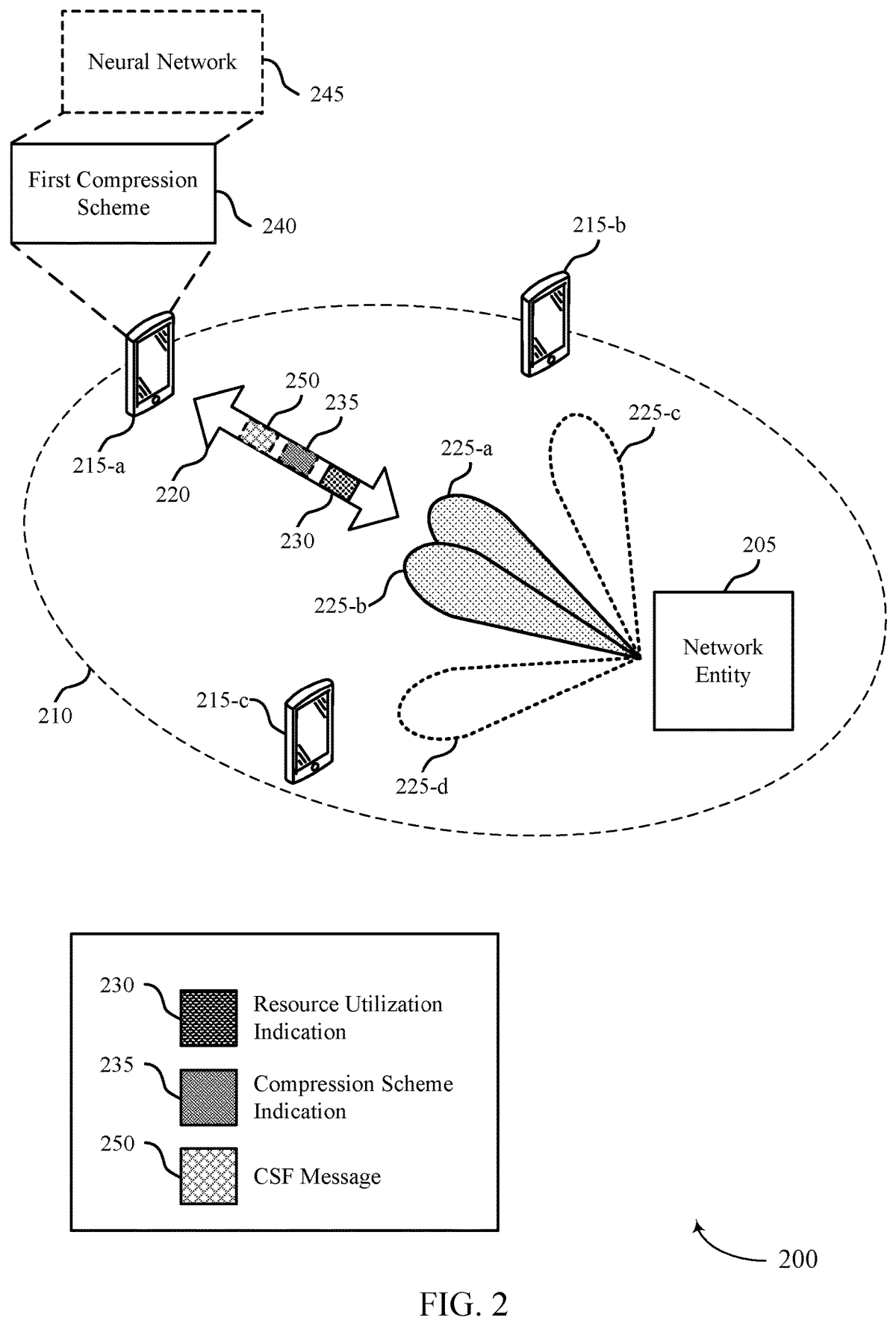

Neural Network

245

First Compression
Scheme

240

215-b 215-a

250

235

225-c 225-a

220

230

225-b

205

215-c

Network
Entity

210

225-d

230 — Resource Utilization
       Indication

235 — Compression Scheme
       Indication

250 — CSF Message

Network Entity

Transceiver

1210

Antenna

1215

Communications Manager

1220

Memory

Code

1230

1225

Processor

1235

1240

1205

1200

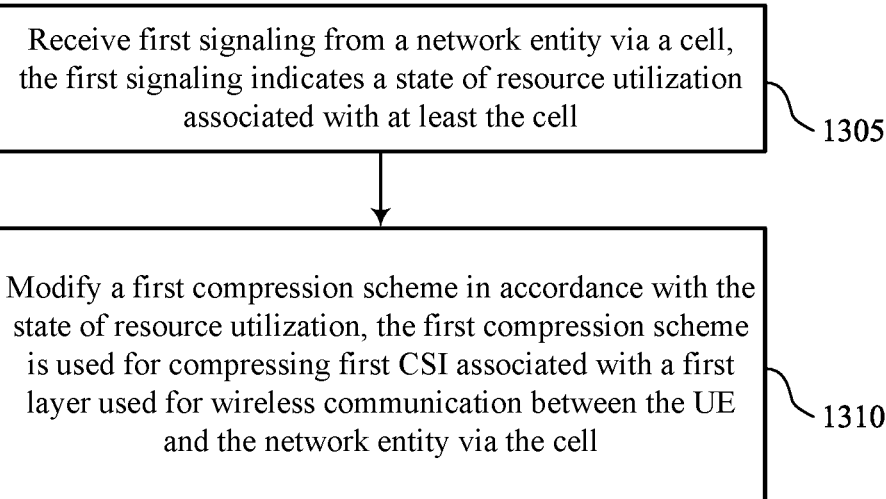

Receive first signaling from a network entity via a cell, the first signaling indicates a state of resource utilization associated with at least the cell

1305

Modify a first compression scheme in accordance with the state of resource utilization, the first compression scheme is used for compressing first CSI associated with a first layer used for wireless communication between the UE and the network entity via the cell

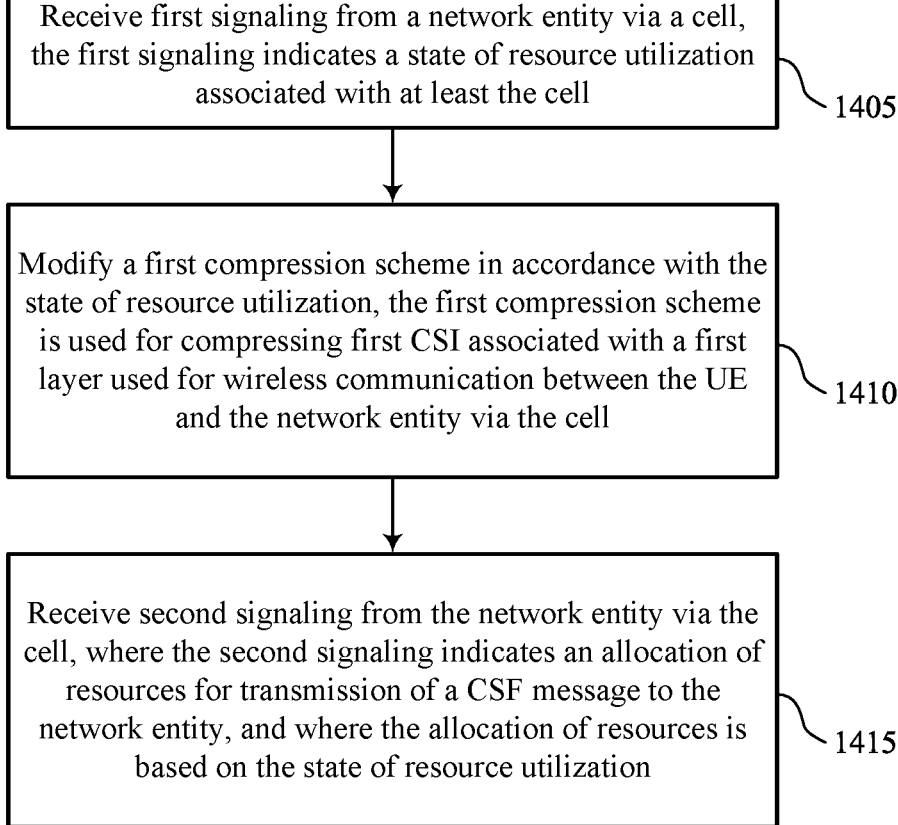

Receive first signaling from a network entity via a cell, the first signaling indicates a state of resource utilization associated with at least the cell ⎱ 1405

Modify a first compression scheme in accordance with the state of resource utilization, the first compression scheme is used for compressing first CSI associated with a first layer used for wireless communication between the UE and the network entity via the cell ⎱ 1410

Receive second signaling from the network entity via the cell, where the second signaling indicates an allocation of resources for transmission of a CSF message to the network entity, and where the allocation of resources is based on the state of resource utilization ⎱ 1415

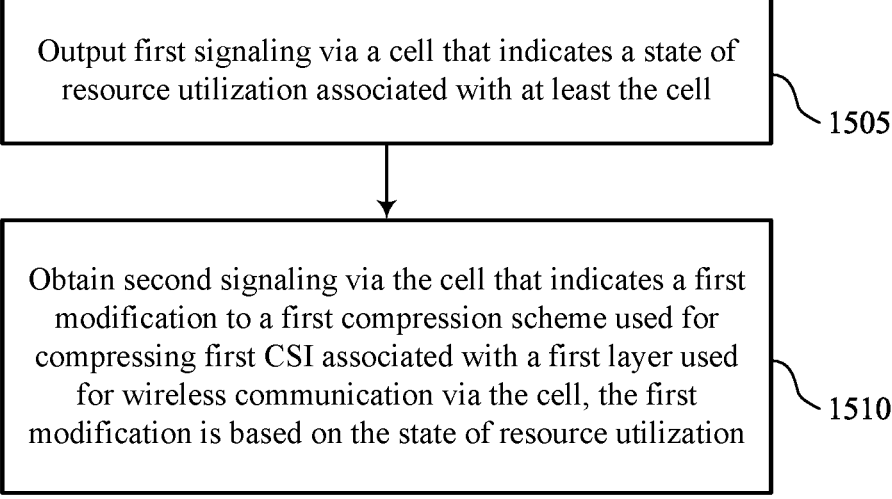

Output first signaling via a cell that indicates a state of resource utilization associated with at least the cell

1505

Obtain second signaling via the cell that indicates a first modification to a first compression scheme used for compressing first CSI associated with a first layer used for wireless communication via the cell, the first modification is based on the state of resource utilization

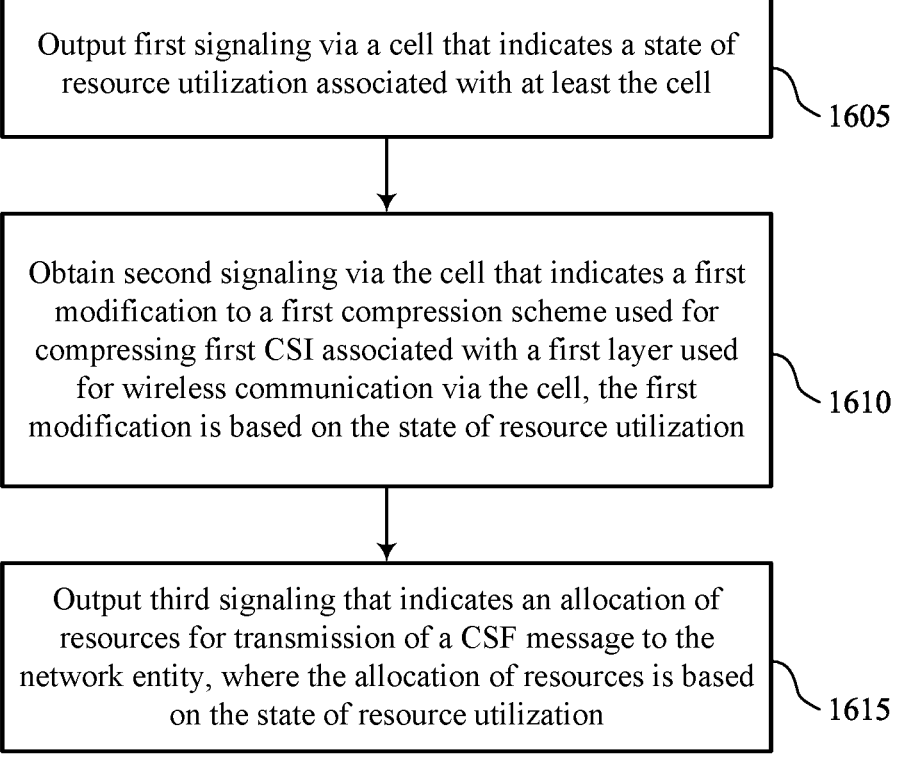

Output first signaling via a cell that indicates a state of resource utilization associated with at least the cell

1605

Obtain second signaling via the cell that indicates a first modification to a first compression scheme used for compressing first CSI associated with a first layer used for wireless communication via the cell, the first modification is based on the state of resource utilization

1610

Output third signaling that indicates an allocation of resources for transmission of a CSF message to the network entity, where the allocation of resources is based on the state of resource utilization

LAYER-SPECIFIC ACCURACY FOR CHANNEL STATE FEEDBACK

FIELD OF TECHNOLOGY

The following relates to wireless communication, including layer-specific accuracy for channel state feedback (CSF).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). In some multiple-access communications systems, a UE may perform channel estimation and report channel state feedback (CSF) associated with the estimated communication channel to a network entity. The network entity may use the reported CSF to improve a capacity of the communication channel through adaptive techniques, such as channel precoding, interference mitigation, and signal rank determination. In some cases, however, existing techniques for reporting CSF may be deficient.

SUMMARY

The described techniques relate to improved methods, systems, devices, and apparatuses that support layer-specific accuracy for channel state feedback (CSF). For example, the described techniques provide a framework for modifying layer-specific channel state information (CSI) compression schemes based on resource utilization. For instance, a user equipment (UE) may receive signaling from a network entity via a cell. In some examples, the signaling may indicate a state of resource utilization associated with at least the cell. In such examples, the UE may modify a compression scheme in accordance with the state of resource utilization. The compression scheme may be used at the UE for compressing CSI associated with a layer used for wireless communication between the UE and the network entity via the cell. The described techniques may include features for improved CSF reporting and, in some examples, may promote increased reliability and reduced latency wireless communications, among other benefits.

A method for wireless communication at a UE is described. The method may include receiving first signaling from a network entity via a cell, the first signaling indicates a state of resource utilization associated with at least the cell and modifying a first compression scheme in accordance with the state of resource utilization, the first compression scheme is used for compressing first CSI associated with a first layer used for wireless communication between the UE and the network entity via the cell.

An apparatus for wireless communication is described. The apparatus may include a processor, memory coupled with the processor, and instructions stored in the memory. The instructions may be executable by the processor to cause the apparatus to receive first signaling from a network entity via a cell, the first signaling indicates a state of resource utilization associated with at least the cell and modify a first compression scheme in accordance with the state of resource utilization, the first compression scheme is used for compressing first CSI associated with a first layer used for wireless communication between the UE and the network entity via the cell.

Another apparatus for wireless communication is described. The apparatus may include means for receiving first signaling from a network entity via a cell, the first signaling indicates a state of resource utilization associated with at least the cell and means for modifying a first compression scheme in accordance with the state of resource utilization, the first compression scheme is used for compressing first CSI associated with a first layer used for wireless communication between the UE and the network entity via the cell.

A non-transitory computer-readable medium storing code for wireless communication at a UE is described. The code may include instructions executable by a processor to receive first signaling from a network entity via a cell, the first signaling indicates a state of resource utilization associated with at least the cell and modify a first compression scheme in accordance with the state of resource utilization, the first compression scheme is used for compressing first CSI associated with a first layer used for wireless communication between the UE and the network entity via the cell.

Some examples of the method, apparatuses, and non-transitory computer-readable medium described herein may further include operations, features, means, or instructions for receiving second signaling from the network entity via the cell, where the second signaling indicates an allocation of resources for transmission of a CSF message to the network entity, and where the allocation of resources may be based on the state of resource utilization.

Some examples of the method, apparatuses, and non-transitory computer-readable medium described herein may further include operations, features, means, or instructions for transmitting the CSF message to the network entity using the allocation of resources, where the CSF message indicates a compression of the first CSI, and where an accuracy associated with the compression may be based on modifying the first compression scheme.

Some examples of the method, apparatuses, and non-transitory computer-readable medium described herein may further include operations, features, means, or instructions for receiving second signaling from the network entity via the cell, where the second signaling identifies a neural network to be used with the first compression scheme, and where the neural network may be associated with the state of resource utilization.

In some examples of the method, apparatuses, and non-transitory computer-readable medium described herein, modifying the first compression scheme in accordance with the state of resource utilization may include operations, features, means, or instructions for modifying the first compression scheme to include use of the neural network for compressing the first CSI.

Some examples of the method, apparatuses, and non-transitory computer-readable medium described herein may further include operations, features, means, or instructions for transmitting second signaling to the network entity, the second signaling indicates that the UE modified the first compression scheme, a duration during which the UE modified the first compression scheme, or both.

In some examples of the method, apparatuses, and non-transitory computer-readable medium described herein, the second signaling further indicates a neural network associated with the first compression scheme, the first layer, or both.

Some examples of the method, apparatuses, and non-transitory computer-readable medium described herein may further include operations, features, means, or instructions for receiving second signaling from the network entity, the second signaling indicates a first rank associated with wireless communication between the UE and the network entity via the cell, where modifying the first compression scheme may be based on the first rank, and where the first rank may be different from a second rank requested by the UE for wireless communication between the UE and the network entity.

Some examples of the method, apparatuses, and non-transitory computer-readable medium described herein may further include operations, features, means, or instructions for transmitting third signaling to the network entity in response to receiving the second signaling, the third signaling indicates a request to use a third rank for wireless communication between the UE and the network entity via the cell, where the third rank may be based on the first rank.

Some examples of the method, apparatuses, and non-transitory computer-readable medium described herein may further include operations, features, means, or instructions for modifying a second compression scheme in accordance with the state of resource utilization, where the second compression scheme may be used for compressing second CSI associated with a second layer used for wireless communication between the UE and the network entity via the cell, and where the first layer may be associated with a first layer index and the second layer may be associated with a second layer index that may be greater than the first layer index.

In some examples of the method, apparatuses, and non-transitory computer-readable medium described herein, the first compression scheme may be modified to use a first quantity of bits for compression of the first CSI and the second compression scheme may be modified to use a second quantity of bits for compression of the second CSI and the first quantity of bits may be greater than the second quantity of bits.

In some examples of the method, apparatuses, and non-transitory computer-readable medium described herein, a first accuracy associated with compression of the first CSI may be greater than a second accuracy associated with compression of the second CSI based on the first quantity of bits being greater than the second quantity of bits.

In some examples of the method, apparatuses, and non-transitory computer-readable medium described herein, the first compression scheme may be modified to use a first quantity of bits for compression of the first CSI and the second compression scheme may be modified to use a second quantity of bits for compression of the second CSI and the first quantity of bits less than the second quantity of bits.

In some examples of the method, apparatuses, and non-transitory computer-readable medium described herein, a first accuracy associated with compression of the first CSI and a second accuracy associated with compression of the second CSI satisfy a threshold based on the first quantity of bits being less than the second quantity of bits.

A method for wireless communication at a network entity is described. The method may include outputting first signaling via a cell that indicates a state of resource utilization associated with at least the cell and obtaining second signaling via the cell that indicates a first modification to a first compression scheme used for compressing first CSI associated with a first layer used for wireless communication via the cell, the first modification is based on the state of resource utilization.

An apparatus for wireless communication is described. The apparatus may include a processor, memory coupled with the processor, and instructions stored in the memory. The instructions may be executable by the processor to cause the apparatus to output first signaling via a cell that indicates a state of resource utilization associated with at least the cell and obtain second signaling via the cell that indicates a first modification to a first compression scheme used for compressing first CSI associated with a first layer used for wireless communication via the cell, the first modification is based on the state of resource utilization.

Another apparatus for wireless communication is described. The apparatus may include means for outputting first signaling via a cell that indicates a state of resource utilization associated with at least the cell and means for obtaining second signaling via the cell that indicates a first modification to a first compression scheme used for compressing first CSI associated with a first layer used for wireless communication via the cell, the first modification is based on the state of resource utilization.

A non-transitory computer-readable medium storing code for wireless communication at a network entity is described. The code may include instructions executable by a processor to output first signaling via a cell that indicates a state of resource utilization associated with at least the cell and obtain second signaling via the cell that indicates a first modification to a first compression scheme used for compressing first CSI associated with a first layer used for wireless communication via the cell, the first modification is based on the state of resource utilization.

Some examples of the method, apparatuses, and non-transitory computer-readable medium described herein may further include operations, features, means, or instructions for outputting third signaling that indicates an allocation of resources for transmission of a CSF message to the network entity, where the allocation of resources may be based on the state of resource utilization.

Some examples of the method, apparatuses, and non-transitory computer-readable medium described herein may further include operations, features, means, or instructions for obtaining the CSF message using the allocation of resources, where the CSF message indicates a compression of the first CSI, and where an accuracy associated with the compression may be based on the first modification.

Some examples of the method, apparatuses, and non-transitory computer-readable medium described herein may further include operations, features, means, or instructions for outputting third signaling via the cell that identifies a neural network to be used with the first compression scheme, where the neural network may be associated with the state of resource utilization.

In some examples of the method, apparatuses, and non-transitory computer-readable medium described herein, the second signaling further indicates a duration during which the first modification to the first compression scheme occurred, a neural network associated with the first compression scheme, the first layer, or any combination thereof.

Some examples of the method, apparatuses, and non-transitory computer-readable medium described herein may further include operations, features, means, or instructions for outputting third signaling that indicates a first rank associated with wireless communication via the cell, where the first modification may be based on the first rank.

Some examples of the method, apparatuses, and non-transitory computer-readable medium described herein may further include operations, features, means, or instructions for obtaining fourth signaling in response to outputting the third signaling, where the fourth signaling indicates a request to use a second rank for wireless communication via the cell, and where the second rank may be based on the first rank.

In some examples of the method, apparatuses, and non-transitory computer-readable medium described herein, the second signaling further indicates a second modification to a second compression scheme used for compressing second CSI associated with a second layer used for wireless communication via the cell and the second modification may be based on the state of resource utilization.

In some examples of the method, apparatuses, and non-transitory computer-readable medium described herein, the first modification identifies a first quantity of bits used for compression of the first CSI and the second modification identifies a second quantity of bits used for compression of the second CSI and the first quantity of bits may be greater than the second quantity of bits.

In some examples of the method, apparatuses, and non-transitory computer-readable medium described herein, a first accuracy associated with compression of the first CSI may be greater than a second accuracy associated with compression of the second CSI based on the first quantity of bits being greater than the second quantity of bits.

In some examples of the method, apparatuses, and non-transitory computer-readable medium described herein, the first modification identifies a first quantity of bits used for compression of the first CSI and the second modification identifies a second quantity of bits used for compression of the second CSI and the first quantity of bits may be less than the second quantity of bits.

In some examples of the method, apparatuses, and non-transitory computer-readable medium described herein, a first accuracy associated with compression of the first CSI and a second accuracy associated with compression of the second CSI satisfy a threshold based on the first quantity of bits being less than the second quantity of bits.

Some examples of the method, apparatuses, and non-transitory computer-readable medium described herein may further include operations, features, means, or instructions for determining the state of resource utilization based on an uplink resource block usage associated with at least the cell, a downlink resource block usage associated with at least the cell, or both.

BRIEF DESCRIPTION OF THE DRAWINGS

FIGS. 1 and 2 each illustrate examples of a wireless communications system that supports layer-specific accuracy for channel state feedback (CSF) in accordance with one or more aspects of the present disclosure.

6

Figure 5:
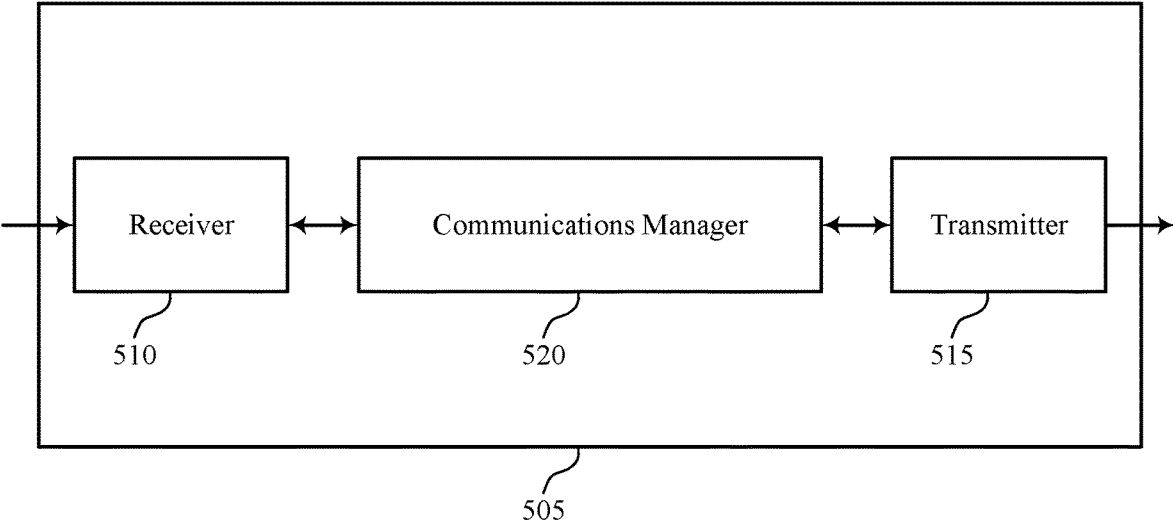
Figure 6:
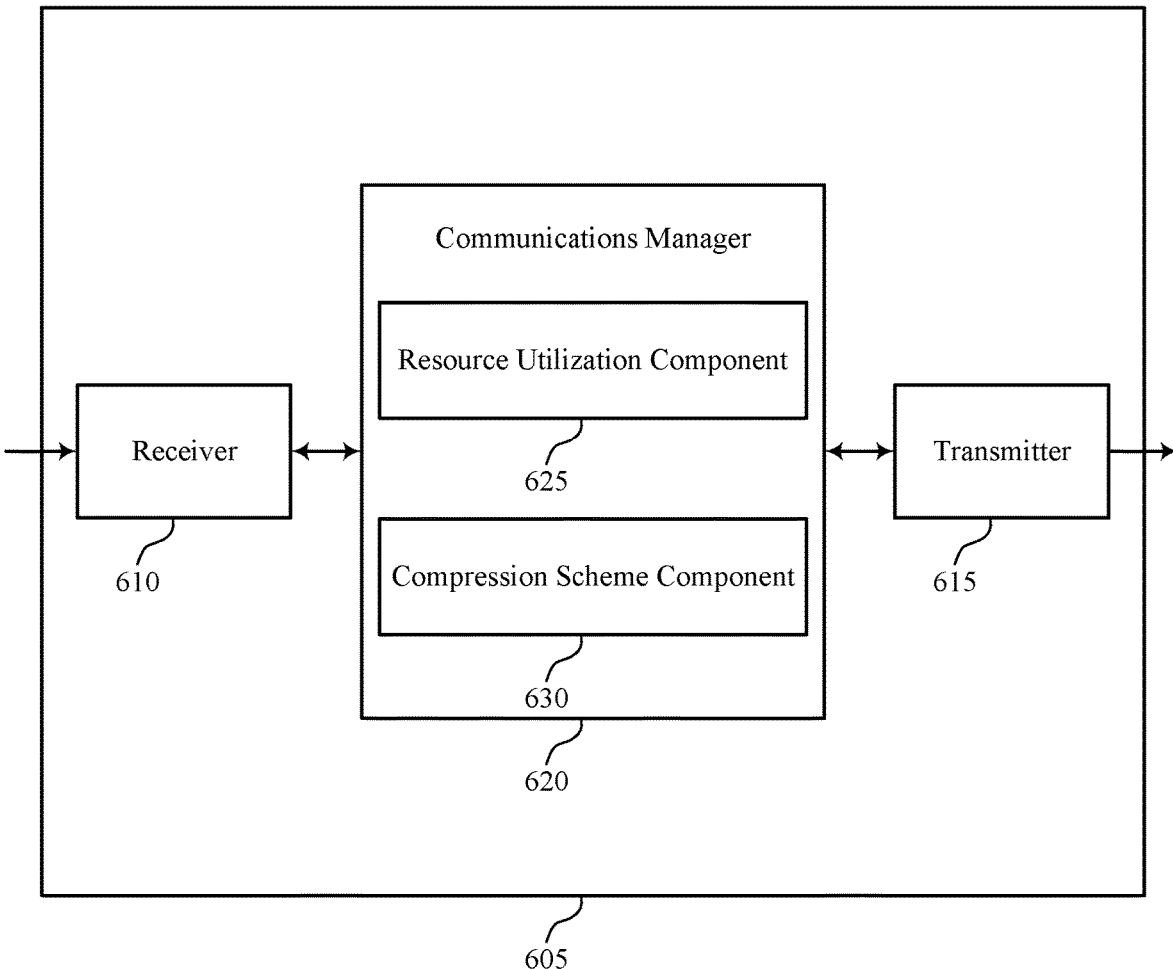

FIGS. 5 and 6 illustrate block diagrams of devices that support layer-specific accuracy for CSF in accordance with one or more aspects of the present disclosure.

Figure 7:
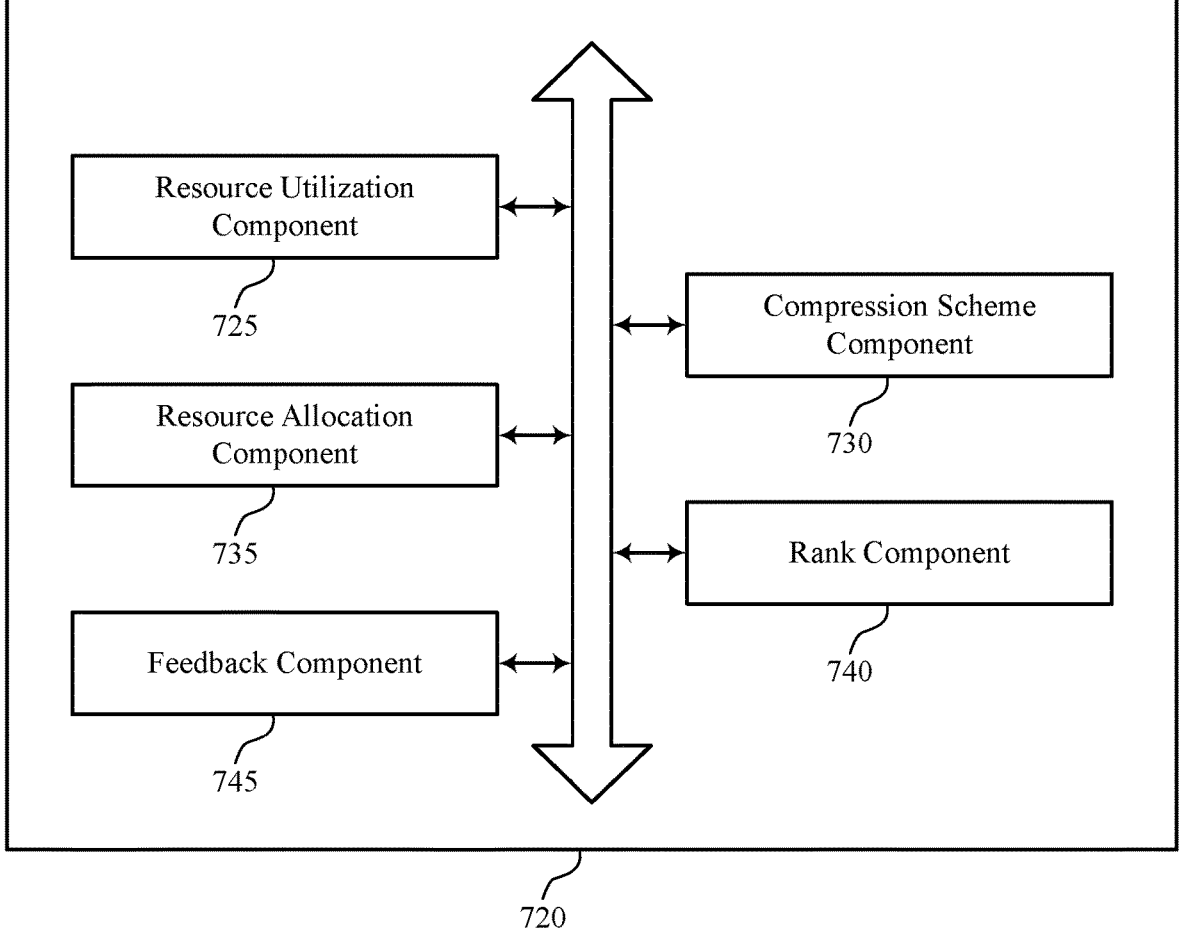

FIG. 7 illustrates a block diagram of a communications manager that supports layer-specific accuracy for CSF in accordance with one or more aspects of the present disclosure.

Figure 8:
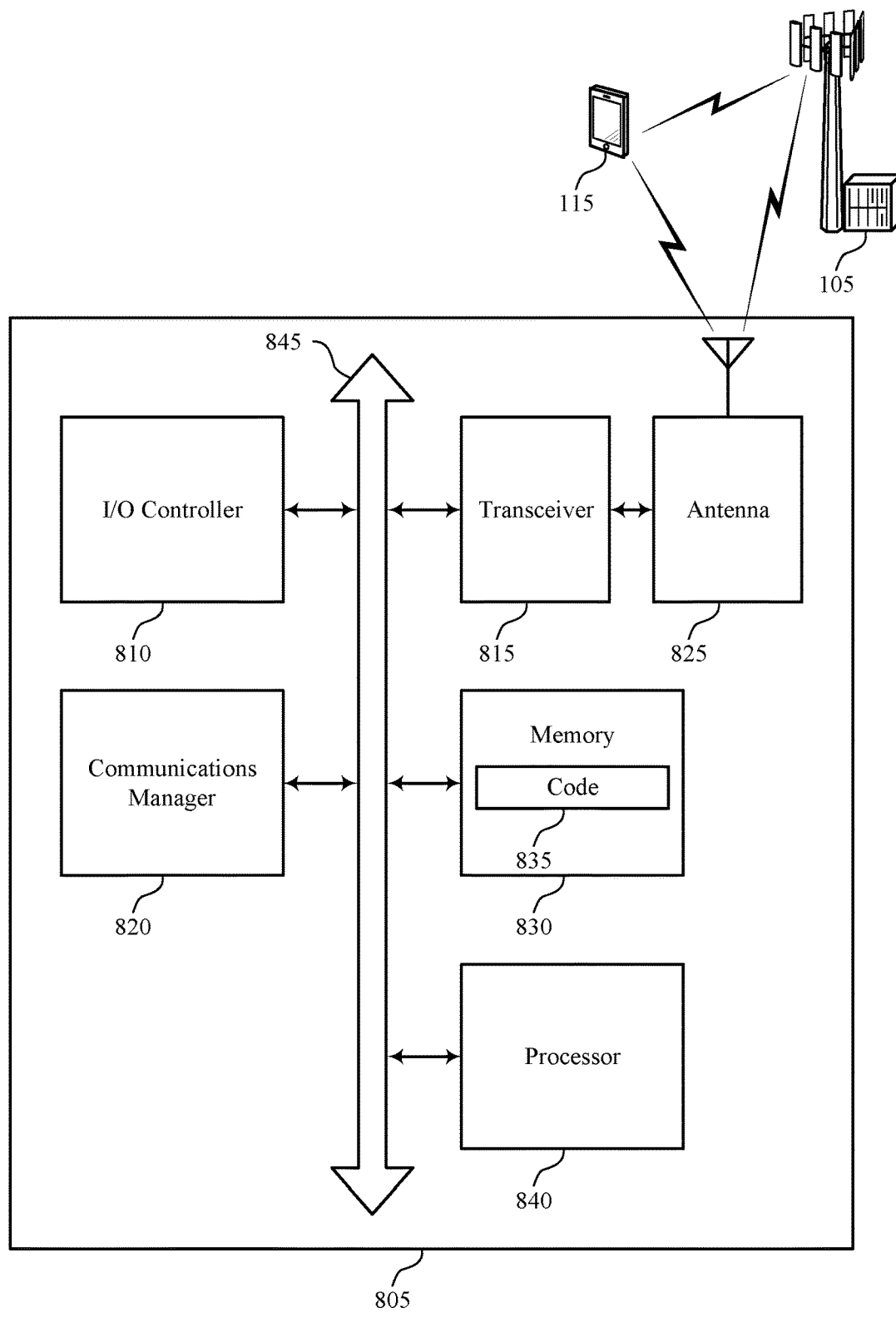

FIG. 8 illustrates a diagram of a system including a device that supports layer-specific accuracy for CSF in accordance with one or more aspects of the present disclosure.

Figure 9:
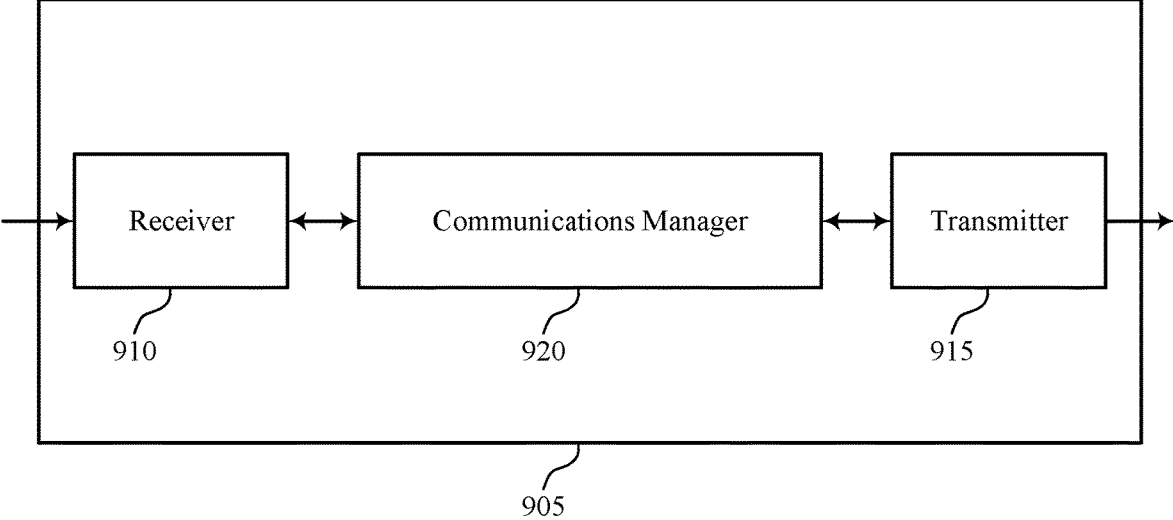
Figure 10:
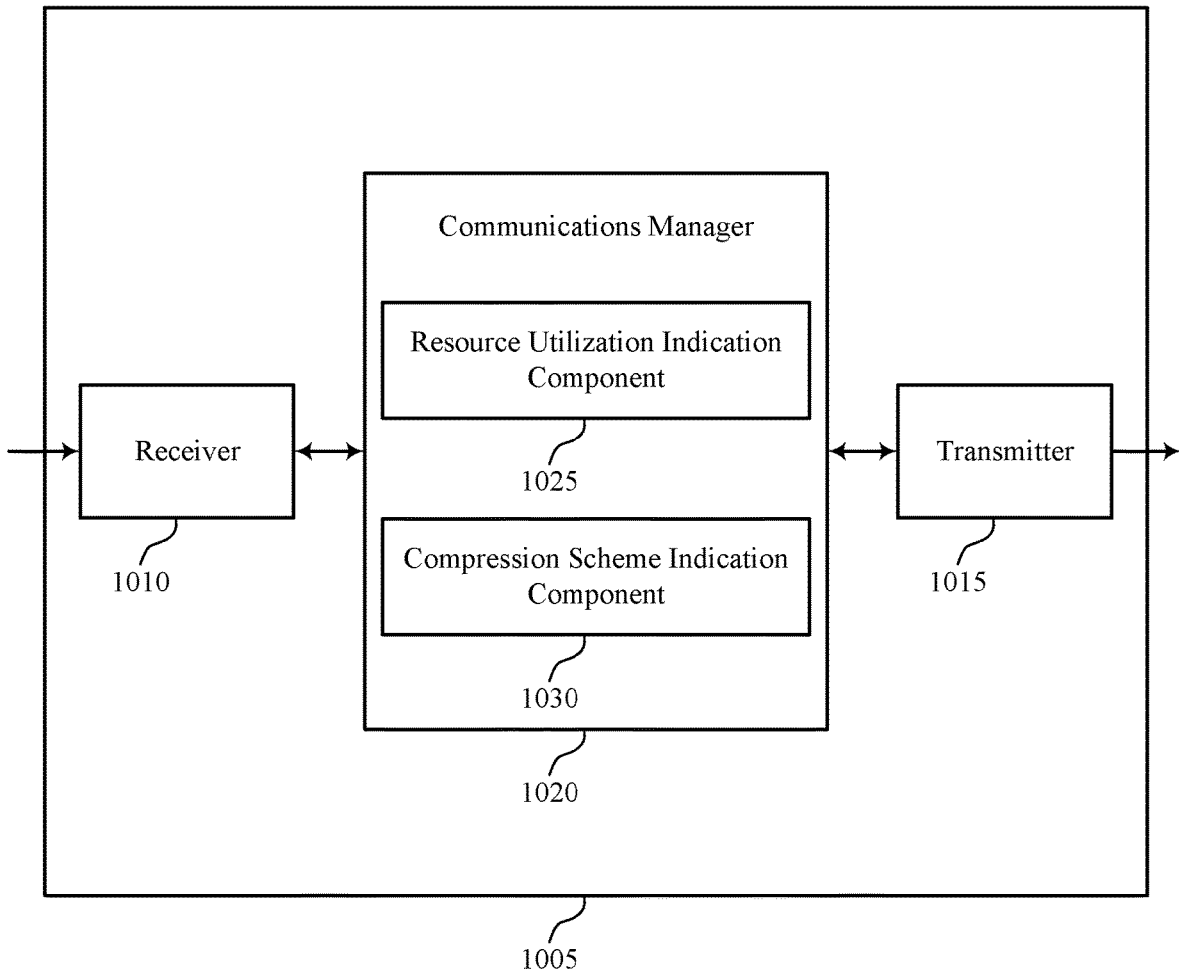

FIGS. 9 and 10 illustrate block diagrams of devices that support layer-specific accuracy for CSF in accordance with one or more aspects of the present disclosure.

Figure 11:
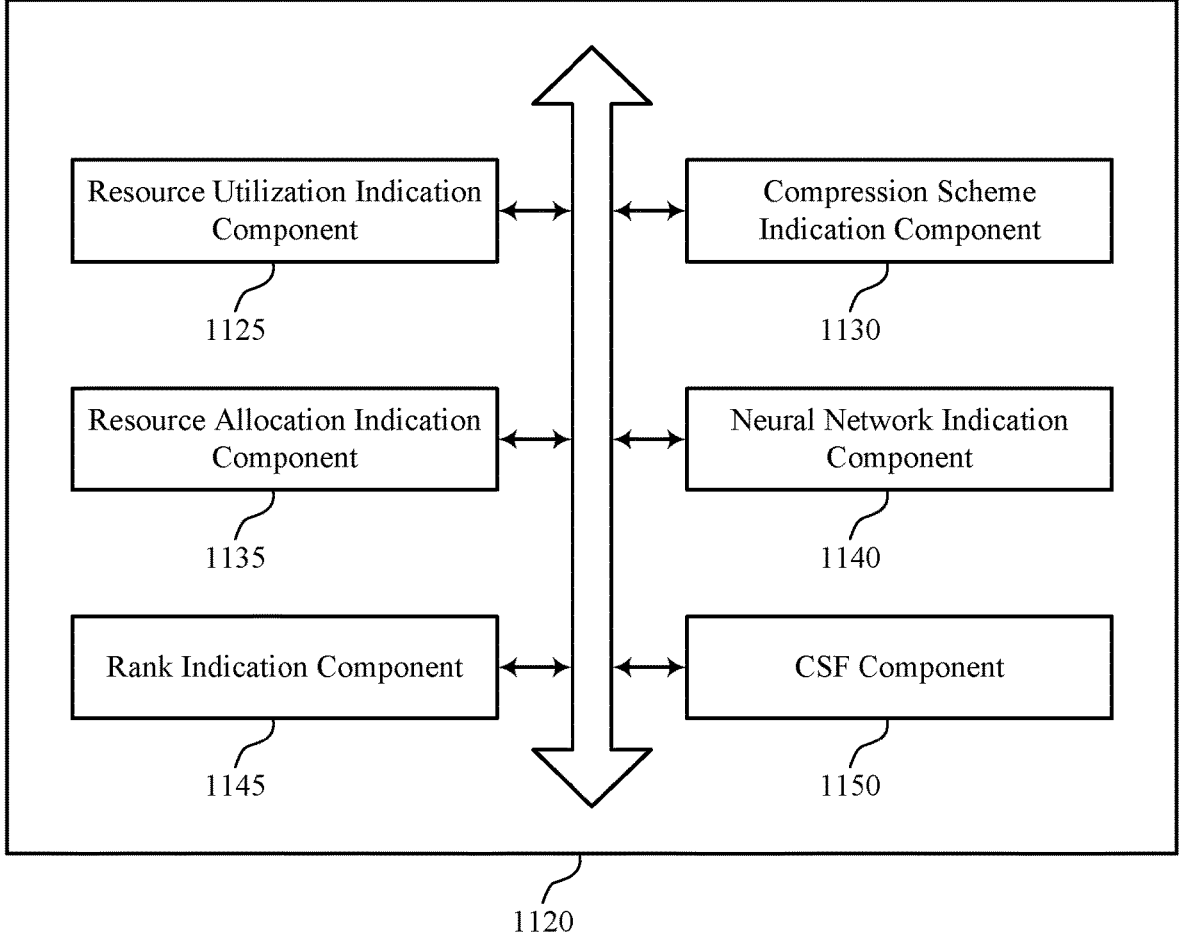

FIG. 11 illustrates a block diagram of a communications manager that supports layer-specific accuracy for CSF in accordance with one or more aspects of the present disclosure.

Figure 12:

FIG. 12 illustrates a diagram of a system including a device that supports layer-specific accuracy for CSF in accordance with one or more aspects of the present disclosure.

FIGS. 13 through 16 illustrate flowcharts showing methods that support layer-specific accuracy for CSF in accordance with one or more aspects of the present disclosure.

DETAILED DESCRIPTION

Some communication devices of a wireless communications system, such as user equipment (UE) and network entities, may support beamforming to improve signal reliability and efficiency for multiple-input, multiple-output (MIMO) communications. In some cases, a beam used for MIMO communications between a UE and the network entity may be impacted by external factors, such as a physical blocking object, signal fading, or other phenomena. To support MIMO communications in the presence of such external factors, the UE may perform channel estimation and report channel state feedback (CSF) associated with the estimated communication channel to the network entity. The network entity may use the reported CSF to increase a capacity of the communication channel through adaptive techniques, such as channel precoding, multi-user MIMO (MU-MIMO) scheduling, interference mitigation, and signal rank determination, among other examples. In some cases, to reduce overhead associated with CSF reporting, the UE may report compressed channel state information (CSI), which the network entity may reconstruct to obtain the estimated communication channel.

For example, the UE may report a compressed representation of a channel response matrix that includes a vector for each beam associated with the communication channel. That is, each vector of the channel response matrix may correspond to a respective beam, which may also be referred to as a layer and, in some examples, the UE may compress each vector individually. For example, the UE may use multiple (e.g., different) neural networks to compress multiple (e.g., different) vectors. Values of a vector may depend on an energy of the corresponding layer. As such, an accuracy with which the UE may compress a vector may also depend on the energy of the corresponding layer. That is, the UE may compress a relatively high energy layer with greater accuracy than the UE may compress a relatively low energy layer. In some examples, resource utilization within the network may be relatively high and a likelihood of the network entity using lower energy layers for downlink communications with the UE may be relatively low. In such examples, reduced compression accuracy for lower energy layers may be relatively inconsequential. In some other examples, however, resource utilization within the network may be relatively low and a likelihood of the network entity using both higher energy layers and lower energy layers for downlink communications with the UE may be relatively high. In some examples, if the compression accuracy is reduced, an accuracy with which the network entity may reconstruct the channel response matrix may also be reduced. As such, reduced compression accuracy for lower energy layers may lead to reduced performance at the network entity.

Various aspects of the present disclosure relate to layer-specific accuracy for CSF, and more specifically, to a framework for modifying layer-specific CSI compression schemes based on resource utilization. For example, the network entity may indicate a state of resource utilization to the UE. The state of resource utilization may be associated with associated with one or more cells served by the network entity. In some examples, the UE may modify one or more compression schemes used at the UE for CSI compression based on the indicated state of resource utilization. For example, the state of resource utilization within the one or more cells may be relatively high. In such an example, the UE may modify the one or more compression schemes, such that a compression accuracy associated with higher energy layers is increased relative to a compression accuracy associated with lower energy layers. For example, the UE may use a first compression scheme for compressing first CSI (e.g., a first vector of the channel response matrix) associated with a relatively high energy layer. In such an example, the UE may modify the first compression scheme such that the compression accuracy for the first CSI may be increased.

In some examples, the UE may increase the accuracy of the first compression scheme by increasing a quantity of bits used for compression via the first compression scheme. Accordingly, to reduce (or maintain) the overhead associated with reporting the CSI, the UE may decrease an accuracy of a second compression scheme by decreasing a quantity of bits used for compression via the second compression scheme. The second compression scheme may be used at the UE for compressing CSI associated with a relatively low energy layer. In some other examples, the state of resource utilization within the one or more cells may be relatively low. In such examples, the UE may decrease the accuracy of the first compression scheme (e.g., by decreasing the quantity of bits used for compression via the first compression scheme) and may increase the accuracy of the second compression scheme (e.g., by increasing a quantity of bits used for compression via the second compression scheme). In some examples, modifying layer-specific CSI compression schemes based on the state of resource utilization may lead to increased reliability and reduced latency wireless communications, among other possible benefits. Aspects of the disclosure are initially described in the context of wireless communications systems and process flows. Aspects of the disclosure are further illustrated by and described with reference to apparatus diagrams, system diagrams, and flowcharts that relate to layer-specific accuracy for CSF.

Figure 1:
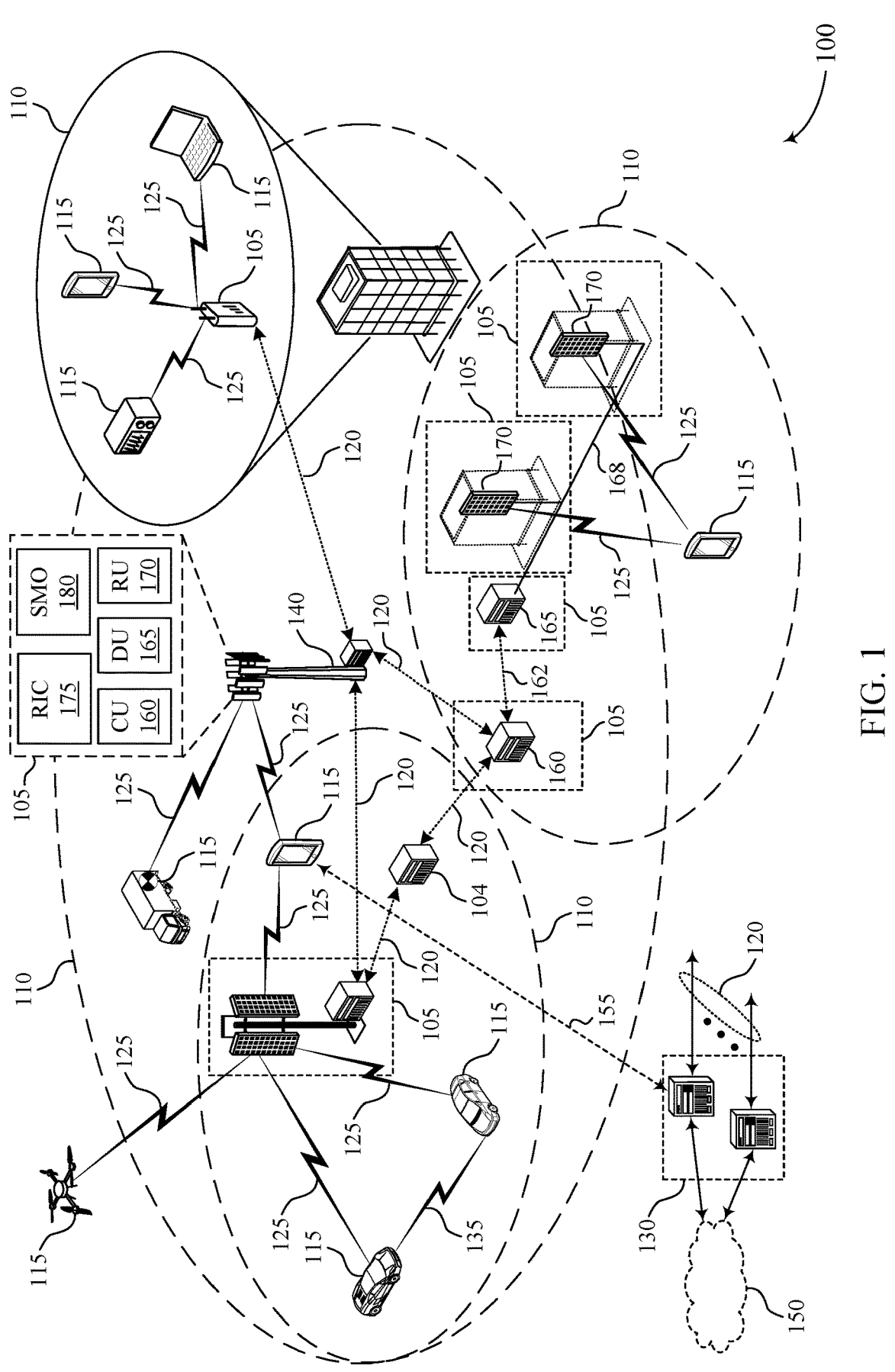

FIG. 1 illustrates an example of a wireless communications system 100 that supports layer-specific accuracy for CSF in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support layer-specific accuracy for CSF as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may support a framework for CSF reporting in which a UE 115 may perform channel estimation and report CSF associated with the estimated communication channel to a network entity 105. The network entity 105 may use the reported CSF to improve a capacity of the communication channel through adaptive techniques, such as channel precoding, interference mitigation, and signal rank determination. The CSF may include compressed CSI for multiple layers, which the network entity 105 may reconstruct to obtain the estimated communication channel. In some cases, however, a compression accuracy associated with the compressed CSI (e.g., a channel response matrix) may be dissimilar across the multiple layers, which may reduce an accuracy with which the network entity 105 may obtain the estimated communication channel, thereby reducing a performance of the network entity 105.

In some examples, however, the UE 115 (and the network entity 105) may support a framework for modifying layer-specific CSI compression schemes based on resource utilization. For example, the UE 115 may receive signaling from the network entity 105 via a cell that indicates a state of resource utilization associated with at least the cell. In such an example, the UE 115 may modify one or more compression schemes associated with one or more layers in accordance with the state of resource utilization. In some examples, by modifying layer-specific compression schemes, the UE may improve CSF reporting and, in some examples, may promote increased reliability and reduced latency wireless communications, among other benefits.

FIG. 2 illustrates an example of a wireless communications system 200 that supports layer-specific accuracy for CSF in accordance with one or more aspects of the present disclosure. The wireless communications system 200 may implement or be implemented at one or more aspects of the wireless communications system 100. For example, the wireless communications system 200 may include a network entity 205, which may be an example of a network entity 105 illustrated by and described with reference to FIG. 1. Additionally, the wireless communications system 200 may include a UE 215-a, a UE 215-b, and a UE 215-c, which may be examples of a UE 115 illustrated by and described with reference to FIG. 1. In the example of FIG. 2, the UEs 215 and the network entity 205 may support wired or wireless communications within a coverage area 210, which may be an example of a coverage area 110 illustrated by and described with reference to FIG. 1. For example, the UE 215-a and the network entity 205 may communicate using a communication link 220 (e.g., an uplink, a downlink), which may be an example of a communication link 125 illustrated by and described with reference to FIG. 1. The network entity may also communicate with the UE 215-b and the UE 215-c via one or more other communication links.

The wireless communications system 200 may be configured to support MIMO communications to enable increased throughput within the wireless communications system 200. Additionally, the UEs 215 and the network entity 205 may support beamforming to improve signal reliability and efficiency for MIMO communications. For example, to increase throughput of wireless communications with the UE 215-a, the network entity may use SU-MIMO to transmit a data stream to the UE 215-a via multiple layers (e.g., spatial layers, beams). For example, the network entity may use four (or more) layers to transmit a data stream to the UE 215-a. In such an example, the four layers may be indexed according to a respective energy of each layer. For example, the four layers may be indexed such that the layer with a highest energy (e.g., relative to the other layers) may have an index of 1 and the layer with the lowest energy (e.g., relative to the other layers) may have an index of 4. In other words, the energy of each layer may decrease, progressively, from Layer 1 to Layer 4. Accordingly, the energy of Layer 1 may be higher that the energy of Layer 2, the energy of layer 2 may be higher than the energy of Layer 3, and the energy of Layer 3 may be higher than the energy of Layer 4. In some examples of SU-MIMO, the network entity may use two layers to transmit a data stream to the UE 215-a. For example, the network entity 205 may transmit a data stream to the UE 215-a via a beam 225-a and a beam 225-b. In some examples, an energy of signaling received the UE 215-a via the beam 225-a may be increased relative to an energy of signaling received at the UE 215-a via the beam 225-b. In such examples, the beam 225-a may correspond to Layer 1 and the beam 225-b may correspond to Layer 2. In other words, a receive strength of the beam 225-a (e.g., Layer 1) may be higher than a receive strength of the beam 225-b (e.g., Layer 2).

Additionally, or alternatively, the network entity may use MU-MIMO to serve an increased quantity of UEs at a relatively higher load. For example, the network entity 205 may use MU-MIMO to concurrently transmit a respective data stream to the UE 215-a, the UE 215-b, and the UE 215-c. In such an example, the network entity 205 may use one or more layers (e.g., beams) to transmit each respective data stream to the UE 215-a, the UE 215-b, and the UE 215-c. For example, the network entity may use the beam 225-a and the beam 225-b to transmit a first data stream to the UE 215-a, a beam 225-c to transmit a second data stream to of the UE 215-b, and a beam 225-d to transmit a third data stream to the UE 215-c. In such an example, layers associated with the beam 225-a, the beam 225-c, and the beam 225-b may have an index of 1 (e.g., may correspond to Layer 1), while a layer associated with the beam 225-b may have an index of 2 (e.g., may correspond to Layer 2). A transmission to the UE 215-b via the beam 225-c and a transmission to the UE 215-c via the beam 225-d may each have a rank of 1, for example due to the respective data streams each being transmitted via a single layer (e.g., Layer 1). Additionally, a transmission to the UE 215-a via the beam 225-a and the beam 225-c may have a rank of 2, for example due to the data stream being transmitted via two layers (e.g., Layer 1 and Layer 2).

In some examples, one or more of the beam 225 may be impacted by external factors, such as a physical blocking object, signal fading, or other phenomena. Therefore, to support MIMO communications in the presence of such external factors, the UEs 215 and the network entity 205 may share information regarding the quality of a communication channel, for example, to improve signal reliability and efficiency for MIMO communications. The communication channel may be represented as a channel response matrix (H). The channel response matrix (H) may be represented in accordance with the following Equation 1:

$$H = USV^h \tag{1}$$

in which U may represent a matrix of left singular vectors and V may represent a matrix of right singular vectors. For example, V may represent a matrix (e.g., a tall matrix) and columns of the matrix may correspond to right singular vectors of H. In such an example, each column of the matrix (V) may be a right singular vector, which may correspond to (e.g., be, include, represent) a unit energy of a respective layer. In such an example, values of the column vectors included in the matrix V may decrease from left to right. That is, a left most column vector of V may represent Layer 1, which may have the highest unit energy relative to the other layers.

In some examples, the network entity 205 may obtain a channel estimate based on measurement performed at the network entity 205. For example, the UE 215-a and the network entity 205 may use a reciprocity-based system, in which a channel estimate (e.g., an estimate of (H)) may be measured at the network entity 205 (e.g., a gNB) and decomposed through singular value decomposition (SVD). For example, the network entity 205 may use uplink sounding reference signals (e.g., transmitted from the UE 215-a) to estimate the channel response matrix (H) and then perform SVD to decompose (H) into three matrices (e.g., U, S, and V). In such examples, a respective noise associated with each column vector of the matrix V (e.g., obtained via SVD) may be relatively similar across multiple layers. That is, a respective accuracy associated with each column vector included in V (e.g., all layers) may satisfy a threshold (e.g., may be within about 2 dB).

In some other examples, the network entity 205 may obtain a channel estimate based on measurement performed at the UE 215-a. For example, the UE 215-a may perform channel estimation and report CSF associated with the estimated communication channel to the network entity 205. The network entity 205 may use the reported CSF to obtain an estimate of the communication channel. In some examples, to reduce overhead associated with CSF reporting, the UE 215-a may report compressed CSI to the network entity 205. In such examples, the network entity 205 may reconstruct the CSI to obtain the estimated communication channel. For example, for a rank greater than 1 (e.g., for a channel response matrix representing more than one layer), the UE 215 may compress right singular vectors of the matrix H for CSF reporting. In some examples, the UE 215-a may compress each layer (e.g., each column vector) of the V matrix individually. For example, the UE 215-a may use multiple (e.g., different) compression schemes to compress multiple (e.g., different) layers. In some examples, the UE 215-a may use machine learning models, such as neural networks, to compress the multiple layers. For example, the UE 215-a may use multiple machine learning models (e.g., neural networks) to compress multiple vectors of the channel response matrix. That is, the UE 215-a may compress different right singular vectors of a communication channel using machine learning CSF.

In some examples, however, it may be more difficult to compress vectors corresponding to lower energy layers (e.g., vectors with relatively low values) than it may be to compress higher energy layers (e.g., vectors with relatively high values). That is, an accuracy with which a neural network may compress a vector may decrease as the layer index of the vector decreases. Accordingly, for compression of CSI at the UE 215-a using neural networks, per-layer CSI accuracy may vary from the strongest layer to the weakest layer. In other words, values of a column vector of V may depend on an energy of the corresponding layer (e.g., a strength of the corresponding beam) and, accordingly, an accuracy with which the UE 215-a (e.g., a neural network used at the UE 215-a) may compress the column vector may also depend on the energy of the corresponding layer (e.g., the strength of the corresponding beam). That is, the accuracy of compression may be greater for compressing the first (e.g., strongest) layer and the accuracy of compression may decrease (e.g., fall) progressively as the layer index increases (e.g., as the layer index goes from i to i+1). For example, the strongest layer may be compressed while retaining a high accuracy, but the accuracy may decrease (e.g., fall, drop) progressively for relatively weaker layers.

In some examples, the compression accuracy may correspond to an accuracy with which the network entity 205 may reconstruct the matrix V from the compression. For example, a generalized cosine similarity (GCS) may be determined in accordance with the following Equation 2:

$$GCS = \hat{V}^h V \tag{2}$$

in which the matrix $\hat{V}$ may represent a reconstruction of the matrix V (e.g., output from a neural network decoder). Accordingly, as $\hat{V}$ approaches V (e.g., as an accuracy of the reconstruction increases, as the reconstruction of V becomes more similar to V), a value of GCS approaches 1. An Equivalent MSE may be determined using the GCS in accordance with the following Equation 3:

$$\text{Equivalent } MSE = 10 * \log_{10}(2 - 2 * GCS)\text{dB.} \tag{2}$$

In accordance with Equation 3, as the value of GCS approaches 1, a value of the Equivalent MSE approaches negative infinity ($-\infty$) dB. Additionally, as the value of GCS approaches 0 (e.g., as an accuracy of the reconstruction decreases, as the reconstruction of V becomes more dissimilar to V), the value of the Equivalent MSE also approaches 0 dB. In some examples, if the value of the Equivalent MSE is 0 dB, the network entity 205 may determine that vectors of the reconstruction ($\hat{V}$) are orthogonal to vectors of (V).

In some examples, a compression accuracy (e.g., a MSE) achieved by a same neural network for multiple layers may be illustrated in the following Table 1:

TABLE 1

| | Equivalent MSE (dB) |
|---|---|
| Layer 1 | −6.63 |
| Layer 2 | −4.46 |

TABLE 1-continued

| Equivalent MSE (dB) | |
| --- | --- |
| Layer 3 | -3.08 |
| Layer 4 | -2.25 |

As illustrated in Table 1, a gap in accuracy for the strongest layer relative to the weakest layer may be relatively large (e.g., several decibels (dBs)). That is, a difference between the compression accuracy of Layer 1 and Layer 2 may be less than a difference between the compression accuracy of Layer 1 and Layer 3. In some examples, an Equivalent MSE value associated with compression of a layer (e.g., a vector corresponding to a particular layer) may change with scenario. For example, the values illustrated in Table 1 (e.g., the Equivalent MSE for each layer) may be based on (e.g., assume) a dense urban scenario. The values illustrated in Table 1 (e.g., values obtained for a dense urban scenario) may be different from other values that may be obtained for other scenarios, such as for urban, sub-urban, or rural, among other examples. That is, the compression accuracy for a layer may depend on the scenario in which the communication channel is measured. In other words, the compression accuracy for a layer may depend on whether the UE 215-a is located in a dense urban area, an urban area, a sub-urban area, or a rural area while the UE 215-a receives signaling (e.g., via the layer) that is used to measure (e.g., and estimate) the communication channel for the layer. Additionally, the values illustrated in Table 1 may be based on (e.g., assume) a same quantity (e.g., an equal number) of bits per layer for compression (e.g., the neural network may use about 128 bits per layer for compression). In other words, the Equivalent MSE values illustrated in Table 1 may be obtained from a same compression scheme or different compression schemes that use a same quantity of bits.

In some examples, while the compression accuracy (e.g., the Equivalent MSE value) for a layer may depend on the scenario in which the estimate of the communication channel is obtained, the decrease (e.g., progression) in compression accuracy from Layer 1 to Layer 4 may occur irrespective of the scenario. That is, irrespective of the scenario, the difference between the compression accuracy of Layer 1 and Layer 2 may be less than the difference between the compression accuracy of Layer 1 and Layer 3 (or Layer 1 and Layer 4). In some examples, such as for examples in which compression accuracy decreases from Layer 1 to Layer 4, the UE may determine to adjust (e.g., modify, change) CSI compression based on a traffic or loading occurring within the network (e.g., on various cells).

For example, a rank of a transmission may correspond to a quantity of layers used for the transmission. For example, a rank with a value of 2 may indicate that the transmission uses two layers and a rank with a value of 4 may indicate that the transmission uses 4 layers. In some examples, such as for a relatively full buffer or relatively high resource utilization traffic scenarios (e.g., scenarios in which the network entity 205 and one or more of the UEs 215 may be downloading relatively large amounts of data), a rank scheduled by the network entity 205 per UE 215 (e.g., for respective communications with each of the UEs 215) may be relatively likely to be low. That is, a likelihood of the network entity 205 scheduling a relatively low rank for communications with the UEs 215 may be relatively high if resource utilization within one or more cells served by the network entity 205 is relatively high. Additionally, due to MU-MIMO, multiple UEs (e.g., two or more of the UEs 215) may be scheduled together, for example in a MU-MIMO packet. In such examples, it may be beneficial to use a higher accuracy compression scheme for stronger layers (e.g., the first two layers, Layer 1 and Layer 2) and a lower accuracy compression scheme for remaining layers (e.g., Layer 3 and Layer 4). That is, it may be beneficial to increase an accuracy of compression schemes used for stronger layers (e.g., Layer 1 and Layer 2) or decrease a compression accuracy for weaker layers (e.g., Layer 3 and Layer 3), or both.

In some examples, to increase compression accuracy for a layer (e.g., to obtain a higher accuracy compression scheme, to increase an accuracy of a compression scheme), the UE 215-a may modify the compression scheme or one or more aspects of the compression scheme. For example, the UE 215-a may increase a quantity of bits used for compression via the compression scheme. In some examples, a compression scheme used for a layer may include (e.g., be associated with) a neural network. In such examples, to decrease compression accuracy for the layer (e.g., to obtain a lower accuracy compression scheme, to reduce the accuracy of the compression scheme), the UE 215-a may decrease a quantity of bits used for compression via the neural network. For example, the UE 215-a may use relatively more bits to compress the stronger layers (e.g., the first two layers, Layer 1 and Layer 2) than the UE 215-a may use to compress weaker layers (e.g., the remaining layers, Layer 3 and Layer 4). In some examples, the UE 215-a may adjust the quantity of bits use per-layer for compression via an algorithm. In some examples, the algorithm (e.g., a water-filling style algorithm) may be similar to an algorithm used for eType-II CSF. In some examples, water filling may refer to the UE 215-a allocating more resources (e.g., bits) to layers that may be relatively easy to compress (e.g., stronger layers) than layers that may be relatively difficult to compress (e.g., weaker layers).

In some other examples, such as for relatively low resource utilization traffic scenarios (e.g., scenarios in which traffic may be bursty), there may be a relatively high likelihood that bursts to individual UEs operating with a cell (e.g., the cell serving the coverage area 210) do not collide. That is, for relatively low resource utilization within the coverage area 210, a likelihood of a traffic burst transmitted to the UE 215-a colliding with a traffic burst to the UE 215-b may be relatively low. In other words (e.g., even on the uplink), a relatively low inter-cell interference may be observed (e.g., within the coverage area 210). As a result, one of the UEs 215 may be served (e.g., from the network entity 205) a relatively high rank on the downlink. That is, a likelihood of the network entity 205 scheduling a relatively high rank for communications with the UE 215-a may be relatively high if resource utilization within one or more cells served by the network entity 205 is relatively low. In other words, it may be relatively likely that a rank scheduled by the network entity 205 for communications with a UE, such as the UE 215-a, may be relatively high for relatively low resource utilization scenarios. In such examples, it may be beneficial to use a relatively similar accuracy compression schemes for multiple layers (e.g., all layers). That is, for channel compression in relatively low resource utilization scenarios, the UE 215-a may modify one or more compression schemes to achieve relatively similar accuracy across multiple layers (e.g., on all the layers up to a rank that the UE 215-a may request from the network entity 205).

In some examples, to achieve relatively similar accuracy across multiple layers, the UE 215-a may decrease an accuracy of compression schemes used for stronger layers (e.g., Layer 1 and Layer 2) or increase a compression accuracy for weaker layers (e.g., Layer 3 and Layer 3), or both. For example, the UE 215-*a* may use relatively less bits to compress the stronger layers (e.g., the first two layers, Layer 1 and Layer 2) than the UE 215-*a* may use to compress weaker layers (e.g., the remaining layers, Layer 3 and Layer 4). In some examples, the UE 215-*a* may adjust the quantity of bits used per-layer for compression via an algorithm. In some examples of the algorithm (e.g., a reverse water-filling style of algorithm), a greater quantity of bits may be used for compressing the weaker layers (e.g., lower energy layers) than the stronger layers (e.g., higher energy layers), such that a respective accuracy (e.g., overall accuracy) of each layer may be relatively similar (e.g., may satisfy a threshold).

In some examples, to increase (or decrease) a quantity of bits used to compress a vector (e.g., a vector corresponding to a particular layer), the UE 215-*a* may modify a neural network (or part of a neural network) used to compress the vector. For example, the UE 215-*a* may switch (e.g., change) neural networks or modify (e.g., change, alter, switch) one or more aspects of a neural network. For instance, multiple neural network may be used (e.g., stored, trained at) at the UE 215-*a* and the network entity 205. That is, a quantity of neural networks may be trained for varying degrees of accuracy of various layers. In some examples, the multiple neural networks may be trained at the network entity 205 and indicated to (or otherwise configured at) the UE 215-*a*. Additionally, or alternatively, the multiple neural networks may be trained at both the UE 215-*a* and the network entity 205. In such examples, the UE 215-*a* may be configured to use a respective neural network to compress each layer. Additionally, the network entity 205 may be configured to use a respective neural network to reconstruct each layer. In some examples, a neural network used to compress a layer at the UE 215-*a* may be a same neural network (e.g., from the multiple neural networks) used to reconstruct the layer at the network entity 205.

As illustrated in the example of FIG. 2, the UE 215-*a* may receive signaling from the network entity 205 (e.g., via the cell providing the coverage area 210) that includes a resource utilization indication 230. In some examples, the resource utilization indication 230 may indicate a state of resource utilization associated with at least the cell. For example, the state of resource utilization may be associated with the cell providing the coverage area 210, one or more other cells served by the network entity 205, or one or more other cells served by another network entity, or any combination thereof.

In some examples, the network entity 205 (e.g., a gNB) may signal to the UE 215-*a* that resource utilization is relatively low. For example, the resource utilization indication 230 may indicate, to the UE 215-*a*, that the state of resource utilization associated with at least the cell is relatively low. In such examples (e.g., in response to receiving an indication that resource utilization is relatively low), the UE 215-*a* may modify one or more compression schemes used at the UE 215-*a* (e.g., on its end), such that an accuracy of the layers (e.g., all the layers) of the channel are relatively similar. In other words, the UE 215-*a* may modify one or more compression schemes used at the UE 215-*a* (e.g., on its end), such that an accuracy with which each vector of the channel response matrix is compressed may be relatively similar (e.g., may satisfy a threshold). That is, the UE 215-*a* may modify one or more compression schemes used at the UE 215-*a*, such that an accuracy associated with compression of each vector of the channel response matrix may satisfy a threshold.

For example, the UE 215-*a* may use a first compression scheme 240 for compressing first CSI associated with a first layer used for wireless communication between the UE 215-*a* and the network entity 205 via the cell. In some examples, in response to receiving the resource utilization indication 230, the UE 215-*a* may modify the first compression scheme 240 in accordance with the indicated state of resource utilization. For example, the resource utilization indication 230 may indicate that the state of resource utilization is relatively low. In such an example, the UE 215-*a* may modify the first compression scheme 240 such that an accuracy associated with compression of the first layer satisfies a threshold (e.g., is similar to an accuracy associated with compression of one or more other layers). For example, the first compression scheme 240 may be used for compression of a vector corresponding to Layer 4. In such an example, if the resource utilization indication 230 indicates that state of resource utilization is relatively low, the UE 215-*a* may modify the first compression scheme 240 to increase an accuracy with which the vector is compressed (e.g., may increase a quantity of bits used for the compression).

In some examples, the UE 215-*a* may signal to the network entity 205 (e.g., the gNB) that such a change occurred (e.g., at a particular time slot). For example, the UE 215-*a* may transmit signaling via the cell that includes a compression scheme indication 235. In some examples, the compression scheme indication 235 may indicate the modification to the first compression scheme 240 (e.g., the compression scheme used for compressing the first CSI associated with the first layer used for wireless communication via the cell). That is, the compression scheme indication 235 may indicate that the UE 215-*a* modified the first compression scheme (or how the UE 215-*a* modified the first compression scheme) based on the state of resource utilization indicated via the resource utilization indication 230.

In some examples, the first compression scheme 240 may include a neural network 245. For example, the UE 215-*a* may use the neural network 245 for compression of the first CSI associated with the first layer. In such an example, the modification to the first compression scheme 240 may include selection of the neural network 245 based on the state of resource utilization. For example, the resource utilization indication 230 may indicate that the state of resource utilization is relatively low. In such an example, the UE 215-*a* may select the neural network 245 such that the accuracy associated with compression of the first layer satisfies the threshold (e.g., is similar to the accuracy associated with compression of one or more other layers). In such an example, the compression scheme indication 235 may indicate a neural network identifier (ID) selected for the compression of the first layer. That is, the compression scheme indication 235 may indicate the neural network ID corresponding to the neural network 245. For example, if the UE 215-*a* uses the neural network 245 for compression of the vector corresponding to the first layer, the network entity 205 may use the neural network 245 (or another suitable neural network) for reconstruction of the vector. Accordingly, the compression scheme indication 235 may include a layer ID corresponding to the first layer and a neural network ID corresponding to the neural network 245, such that the network entity 205 may identify a suitable neural network for reconstruction of the first layer. In other words, if multiple neural networks have been trained and stored at the UE 215-*a* and the network entity 205, the UE 215-*a* may signal, to the network entity 205, that a change for particular layer occurred (e.g., that a particular neural network has be selected for a particular layer).

In some other examples, the network entity 205 (e.g., a gNB) may signal to the UE 215-a that a load on the wireless communications system 200, and therefore the resource utilization, is relatively high. That is, the resource utilization indication 230 may indicate that the state of resource utilization associated with at least the cell is relatively high. In such examples, in response to the network entity 205 indicating that the state of resource utilization is relatively high, the UE 215-a may modify one or more compression schemes used at the UE 215-a to increase a compression accuracy for the stronger layers and reduce an compression accuracy for weaker layers (e.g., improve on stronger layers and reduce on weaker layers). That is, the UE 215-a may modify one or more compression schemes used at the UE 215-a (e.g., on its end), such that a compression accuracy for vectors of the channel response matrix that correspond to the stronger layers (e.g., Layer 1, Layer 2) may be higher than a compression accuracy for vectors of the channel response matrix that correspond to the weaker layers (e.g., Layer 3, Layer 4). In other words, the UE 215-a may modify one or more compression schemes used at the UE 215-a, such that an accuracy associated with compression of a first one or more vectors of the channel response matrix may be greater than an accuracy associated with compression of remaining vectors.

For example, the first layer may correspond to Layer 1 (or Layer 2) and the resource utilization indication 230 may indicate that the state of resource utilization is relatively high. In such an example, the UE 215-a may modify the first compression scheme 240 such that an accuracy associated with compression of the first layer (e.g., Layer 1) is increased. That is, the UE 215-a may modify the first compression scheme 240 such that a quantity of bits used to compress a vector corresponding to Layer 1 is increased. In some other examples, the first layer may correspond to Layer 4 (or Layer 3) and the resource utilization indication 230 may indicate that the state of resource utilization is relatively high. In such examples, the UE 215-a may modify the first compression scheme 240 such that an accuracy associated with compression of the first layer (e.g., Layer 4) is decreased. That is, the UE 215-a may modify the first compression scheme 240 such that a quantity of bits used to compress a vector corresponding to Layer 4 is decreased.

In some examples, the network entity 205 may indicate one or more neural network identifiers to the UE 215-a for compression of one or more layers. For example, the resource utilization indication 230 may indicate, to the UE 215-a, the state of resource utilization (e.g., whether the resource utilization is relatively low or relatively high) and indicate an identifier of a neural network to be used at the UE 215-a with the first compression scheme 240. Additionally, in some examples, the CSF message may include an indication of one or more neural network (e.g., all neural networks) used at the UE 215-a for compression of one or more layers (e.g., all layers).

In some examples, the UE 215-a may signal to the network entity 205 (e.g., the gNB) that such a change occurred (e.g., at a particular time slot). For example, if the resource utilization indication 230 indicates that the state of resource utilization is relatively high, the UE 215-a may select the neural network 245 such that the accuracy associated with compression of the first layer is increased or decreased (e.g., increased for Layer 1, decreased for Layer 4). In such an example, the compression scheme indication 235 may include a layer ID corresponding to the first layer and a neural network ID corresponding to the neural network 245, such that the network entity 205 may identify a suitable neural network (e.g., the neural network 245 or another neural network) for reconstruction of the first layer.

In such examples, the network entity 205 may signal, to the UE 215-a, that a likelihood of the network entity 205 scheduling a relatively low rank for communications with the UE 215-a may be relatively high. That is, the network entity 205 may indicate, to the UE 215-a, that the network entity 205 expects a first rank scheduled for communications with the UE 215-a (e.g., a max-rank scheduled) to be lower than a second rank requested by the UE 215-a (e.g., for a duration, for a future duration). For example, the UE 215-a may receive signaling from the network entity 205 that indicates the first rank associated with wireless communication between the UE 215-a and the network entity 205 via the cell. In such examples, the UE 215-a may determine that the first rank is lower than the second rank requested by the UE 215-a. In such an example, the UE 215-a may modify the first compression scheme based on the first rank (e.g., and the indicated state of resource utilization).

Additionally, or alternatively, the UE 215-a may reduce a rank requested by the UE 215-a per transmission (e.g., in a CSF message 250). For example, the UE 215-a may transmit the CSF message 250 to the network entity 205 that indicates a compression of the first CSI. In some examples, the CSF message 250 may indicate a compression of the vector corresponding to the first layer (e.g., and one or more other vectors corresponding to one or more other layers) in which an accuracy associated with the compression of the first vector may be based on modifying the first compression scheme 240. That is, the accuracy may be based on the modification to the first compression scheme 240. Additionally, the CSF message 250 may indicate a request, from the UE 215-a, to use a third rank for wireless communication with the network entity 205 via the cell. For example, the UE 215-a may request to use the third rank for wireless communications between the UE 215-a and the network entity 205. In such an example, the third rank may be based on the first rank. In some examples, an allocation of resources used at the UE 215-a for transmission of the CSF message 250 may be based on the state of resource utilization. For example, if resource utilization is relatively low, the UE 215-a may use an increased quantity of bits to compress multiple layers with a relatively similar accuracy. In such an example, because the UE 215-a may use an increased quantity of bits to compress multiple layers with a relatively similar accuracy, the network entity 205 may allocate an increased quantity of resources to the UE 215-a for transmission of the CSF message 250. In some examples, by modifying the first compression scheme 240 based on the state of resource utilization (e.g., indicated via the resource utilization indication 230) the UE 215-a may increase a reliability of wireless communications within the wireless communications system 200, among other possible benefits.

Figure 3:
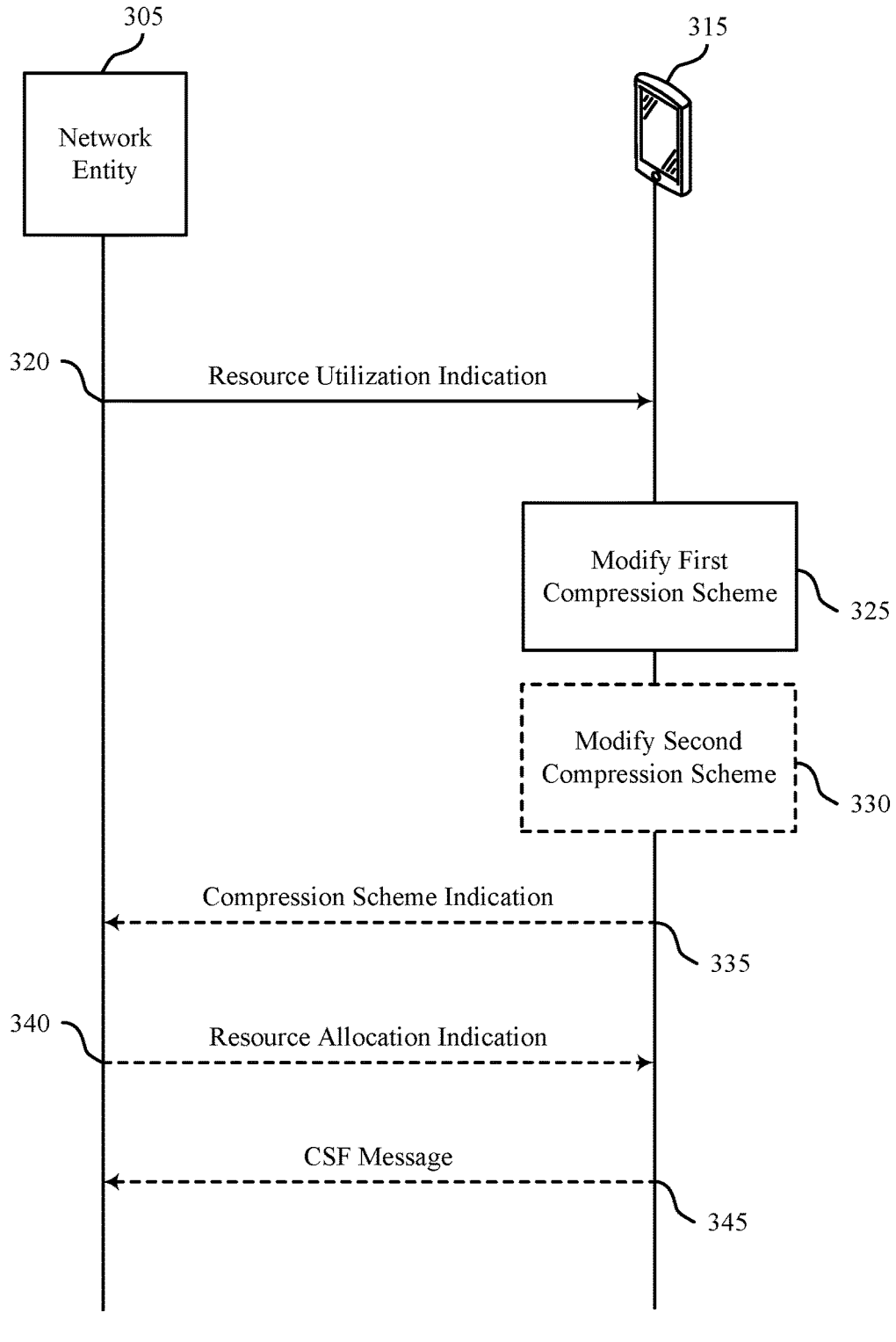
FIGS. 3 and 4 each illustrate examples of a process flow that supports layer-specific accuracy for CSF in accordance with one or more aspects of the present disclosure.

FIG. 3 illustrates an example of a process flow 300 that supports layer-specific accuracy for CSF in accordance with one or more aspects of the present disclosure. The process flow 300 may implement or be implemented at one or more aspects of the wireless communications system 100 and the wireless communications system 200. For example, the process flow 300 may include example operations associated with a UE 315 and a network entity 305, which may be examples of the corresponding devices illustrated by and described with reference to FIGS. 1 and 2. The operations performed at the UE 315 and the network entity 305 may support improvements to communications between the UE 315 and the network entity 305, among other benefits. In the following description of the process flow 300, the operations performed at the UE 315 and the network entity 305 may occur in a different order than the example order shown. Additionally, the operations performed at the UE 315 and the network entity 305 may be performed at different times. Some operations may be combined and some operations may be omitted.

In some examples, the UE 315 and the network entity 305 may support a framework for modifying layer-specific CSI compression schemes based on resource utilization. That is, the UE 315 may modify a respective compression scheme for one or more layer based on a state of resource utilization determined at the network entity 305. In the example of FIG. 3, the network entity 305 may determine that the state of resource utilization is relatively high. Accordingly, the network entity 305 may indicate the state of resource utilization to the UE 315 such that the UE 315 may modify one or more compression schemes used at the UE 315 accordingly. For example, based on the state of resource utilization being relatively high, the UE 315 may modify one or more compression schemes, such that an accuracy of CSI associated with relatively strong layers may be preserved. For example, the UE 315 may use higher accuracy compression schemes (e.g., more bits) for stronger layers and lower accuracy compression schemes (e.g., less bits) for weaker layers.

At 320, the UE 315 may receive a resource utilization indication from the network entity 305 via the cell. In some examples, the resource utilization indication may be an example of a resource utilization indication illustrated by and as described with reference to FIGS. 1 and 2. For example, the resource utilization indication may indicate the state of resource utilization associated with at least the cell. In the example of FIG. 3, the resource utilization indication may indicate that the state of resource utilization within at least the cell is relatively high.

At 325, in response to receiving the resource utilization indication at 320, the UE 315 may modify a first compression scheme in accordance with the state of resource utilization. In some examples, the first compression scheme may be used at the UE 315 for compressing first CSI associated with a first layer used for wireless communication between the UE 315 and the network entity 305 via the cell.

In some examples, at 330, the UE 315 may also modify a second compression scheme in accordance with the state of resource utilization. In such examples, the first layer may be associated with a first layer index and the second layer may be associated with a second layer index that is greater than the first layer index. For example, the first compression scheme may be used for compression of Layer 1 (or Layer 2) and the second compression scheme may be used for compression Layer 4 (or Layer 3).

In some examples, based on the state of resource utilization being relatively high, the UE 315 may modify the first compression scheme to use a first quantity of bits. Additionally, the UE 315 may modify the second compression scheme to use a second quantity of bits that is less than the first quantity of bits. Accordingly, a first accuracy associated with compression of the first CSI (e.g., using the first compression scheme) may be greater than a second accuracy associated with compression of the second CSI (e.g., using the second compression scheme) based on the first quantity of bits being greater than the second quantity of bits.

In some examples, at 335, the UE 315 may transmit a compression scheme indication to the network entity 305. The compression scheme indication may be an example of the compression scheme indication illustrated by and described with reference to FIG. 2. For example, the compression scheme indication may indicate that the UE 315 modified the first compression scheme (e.g., and the second compression scheme). Additionally, or alternatively, the compression scheme indication may indicate a duration during which the UE 315 modified the first compression scheme or the second compression scheme, or both.

In some examples, 340, the UE 315 may receive a resource allocation indication from the network entity 305 via the cell. The resource allocation indication may be an example of a resource allocation indication illustrated by and described with reference to FIG. 2. For example, the resource allocation indication may indicate an allocation of resources for transmission of a CSF message to the network entity 305. In some examples, the allocation of resources may be based on the state of resource utilization. For example, if the state of resource utilization is relatively high, the allocation of resources may be reduced.

In some examples, at 345, the UE 315 may transmit the CSF message to the network entity 305 using the allocation of resources. In such examples, the CSF message may indicate a compression of the first CSI, the second CSI, or both. Additionally, in such examples, an accuracy associated with the compression of the first CSI may be based on modifying the first compression scheme and an accuracy associated with compression of the second CSI may be based on modifying the second compression scheme. In some examples, by modifying layer-specific compression schemes, the UE 315 may improve CSF reporting to the network entity 305, among other possible benefits.

Figure 4:
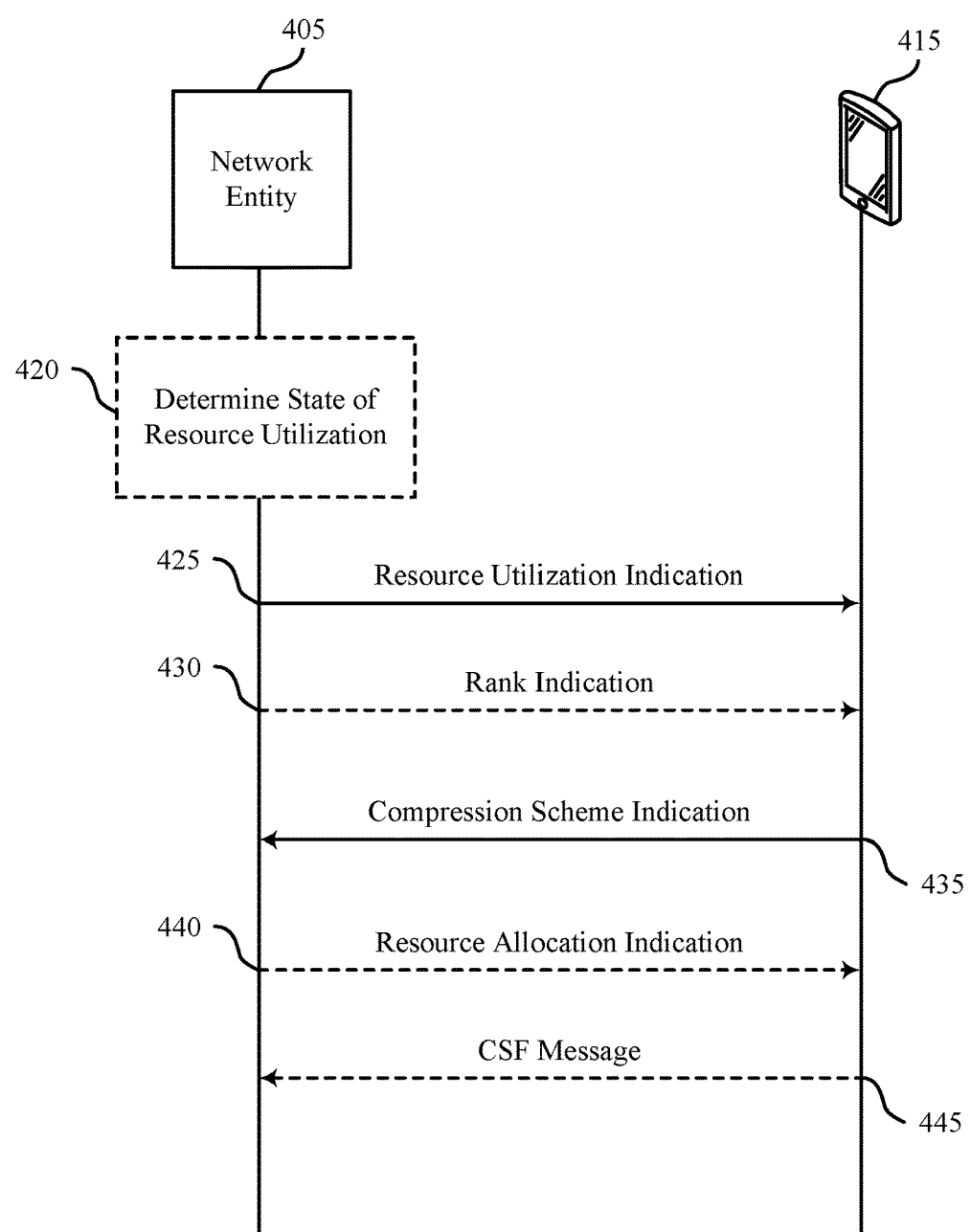

FIG. 4 illustrates an example of a process flow 400 that supports layer-specific accuracy for CSF in accordance with one or more aspects of the present disclosure. The process flow 400 may implement or be implemented at one or more aspects of the wireless communications system 100, the wireless communications system 200, and the process flow 300. For example, the process flow 400 may include example operations associated with a UE 415 and a network entity 405, which may be examples of the corresponding devices illustrated by and described with reference to FIGS. 1 through 3. The operations performed at the UE 415 and the network entity 405 may support improvements to communications between the UE 415 and the network entity 405, among other benefits. In the following description of the process flow 400, the operations performed at the UE 415 and the network entity 405 may occur in a different order than the example order shown. Additionally, the operations performed at the UE 415 and the network entity 405 may be performed at different times. Some operations may be combined and some operations may be omitted.

In some examples, the network entity 405 may be capable of indicating, to the UE 415, a likelihood of the UE 415 receiving a relatively large rank allocation, such that the UE 415 may tune CSI compression based on the indicated likelihood. In such examples, the likelihood of the UE 415 receiving a relatively large rank allocation may be based on a state of resource utilization.

For example, at 420, the network entity 405 may determine a state of resource utilization within at least a cell served by the network entity 405. In some examples, the network entity 405 may determine the state of resource utilization based on an uplink resource block usage associated with at least the cell, a downlink resource block usage associated with at least the cell, or both. For example, the network entity 405 may perform one or more measurements to determine the uplink resource block usage or the downlink resource block usage, or both, within at least the cell. In the example of FIG. 4, the network entity 405 may determine that the state of resource utilization is relatively low. In some examples, if the resource utilization is relatively low (e.g., if loading on the network entity 405 is relatively light) the UE 415 may have an increased likelihood of receiving grants with relatively high ranks. Accordingly, the UE 415 may determine to modify one or more compression schemes used at the UE 415, such that an compression accuracy for multiple layers (e.g., all layers) may be preserved.

In some examples, the network entity 405 may transmit signaling to the UE 415 to trigger the UE 415 to switch one or more neural networks used at the UE 415 for compression of one or more layers. For example, the network entity 405 may indicate, to the UE 415, to modify CSI compression accuracy per layer (e.g., for multiple layers) in accordance with the state of resource utilization. In some examples, resource utilization within at least the cell may be relatively low (e.g., may decrease). In such examples, the network entity 405 may signal, to the UE 415, to change a compression algorithm (e.g., at the UE 415) such that the multiple layers may be compressed with near similar accuracies. Additionally, or alternatively, the network entity 405 may increase an uplink grant for feedback of CSF (e.g., including the compressed CSI).

In some examples, the network entity 405 may signal, to the UE 415, to modify the compression algorithm (e.g., the CSI compression accuracy per layer) by transmitting an indication of one or more neural networks to be used for compressing CSI associated with one or more layers. For example, the network entity 405 may indicate a neural network to be used for compression of CSI associated with a layer. In such an example, the UE 415 may modify the compression scheme to include use of the indicated neural network for compressing the CSI associated with the layer. Additionally, or alternatively, as illustrated in the example of FIG. 4, the UE 415 may modify the CSI compression accuracy per layer based on a state of resource utilization.

At 425, the network entity 405 may transmit a resource utilization indication from to the UE 415 via the cell. In some examples, the resource utilization indication may be an example of a resource utilization indication as described with reference to FIGS. 1 through 3. For example, the resource utilization indication may indicate the state of resource utilization associated with at least the cell. In the example of FIG. 4, the resource utilization indication may indicate that the state of resource utilization within at least the cell is relatively low.

In some examples, at 430, the network entity 405 may transmit a rank indication to the UE 415. The rank indication may be an example of a rank indication as described throughout the present disclosure. For example, the rank indication may indicate a first rank associated with wireless communication via the cell. In such examples, one or more modifications to the CSI compression accuracy per layer may be based on the first rank.

At 435, the network entity 405 may receive a compression scheme indication from the UE 415 indicating a first modification to a first compression scheme used for compressing first CSI associated with a first layer used for wireless communication via the cell. In some examples, the first modification may be based on the state of resource utilization and the first rank. That is, the compression scheme indication may indicate that the UE 415 modified a neural network (or one or more aspects of a neural network, such as a quantity of nodes or a quantity of hidden layers) for compression of the first CSI. In some examples, the compression scheme indication may indicate that the UE 415 modified the neural network by indicating a neural network ID change. In some examples, the compression scheme indication may indicate a second modification to a second compression scheme used for compressing second CSI associated with a second layer used for wireless communication via the cell. In such examples, the second modification may also be based on the state of resource utilization (e.g., and the first rank). In some examples, the compression scheme indication may indicate a duration during which the UE 415 modified the first compression scheme, the second compression scheme, or both.

In some examples, the first layer may correspond to a stronger layer (e.g., Layer 1 or Layer 2) and the second layer may correspond to a weaker layer (e.g., Layer 4 or Layer 3). In such examples, based on the state of resource utilization being relatively low, the first modification may identify a first quantity of bits used for compression of the first CSI (e.g., for the first layer) and the second modification may identify a second quantity of bits used for compression of the second CSI (e.g., for the second layer) in which the first quantity of bits is less than the second quantity of bits. For example, the first modification may indicate that the UE 415 used a first neural network associated with the first quantity of bits to compress the first CSI for the first layer and a second neural network associated with the second quantity of bits to compress the second CSI for the second layer. In some examples, a first accuracy associated with compression of the first CSI and a second accuracy associated with compression of the second CSI may satisfy a threshold (e.g., be relatively similar) based on the first quantity of bits being less than the second quantity of bits.

In some examples, 440, the network entity 405 may transmit a resource allocation indication to the UE 415 via the cell. The resource allocation indication may be an example of a resource allocation indication illustrated by and described with reference to FIGS. 2 and 3. For example, the resource allocation indication may indicate an allocation of resources for transmission of a CSF message to the network entity 405. In some examples, the allocation of resources may be based on the state of resource utilization. For example, based on the state of resource utilization being relatively low, the network allocation of resources may be increased.

In some examples, at 445, the network entity 405 may receive the CSF message using the allocation of resources. In such examples, the CSF message may indicate a compression of the first CSI, a compression of the second CSI, or both. Additionally, or alternatively, an accuracy associated with the compression of the first CIS may be based on the first modification to the first compression scheme and an accuracy associated with the compression of the second CSI may be based on the second modification to the second compression scheme. In some examples, the CSF message may indicates a request for the network entity 405 to use a second rank for wireless communication with the UE 415 via the cell. In such examples, the second rank may be based on the first rank (e.g., indicated at 430). In some examples, by indicating the state of resource utilization to the UE 415, the network entity 405 may enable layer-specific accuracy for CSF, which may lead to increased reliability and reduced latency wireless communication between the network entity 405 and the UE 415, among other possible benefits.

FIG. 5 illustrates a block diagram 500 of a device 505 that supports layer-specific accuracy for CSF in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to layer-specific accuracy for CSF). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to layer-specific accuracy for CSF). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of layer-specific accuracy for CSF as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE (e.g., the device 505) in accordance with examples as disclosed herein. For example, the communications manager 520 may be configured as or otherwise support a means for receiving first signaling from a network entity via a cell, the first signaling indicates a state of resource utilization associated with at least the cell. The communications manager 520 may be configured as or otherwise support a means for modifying a first compression scheme in accordance with the state of resource utilization, the first compression scheme is used for compressing first CSI associated with a first layer used for wireless communication between the UE and the network entity via the cell.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources.

FIG. 6 illustrates a block diagram 600 of a device 605 that supports layer-specific accuracy for CSF in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to layer-specific accuracy for CSF). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to layer-specific accuracy for CSF). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of layer-specific accuracy for CSF as described herein. For example, the communications manager 620 may include a resource utilization component 625 a compression scheme component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE (e.g., the device 605) in accordance with examples as disclosed herein. The resource utilization component 625 may be configured as or otherwise support a means for receiving first signaling from a network entity via a cell, the first signaling indicates a state of resource utilization associated with at least the cell. The compression scheme component 630 may be configured as or otherwise support a means for modifying a first compression scheme in accordance with the state of resource utilization, the first compression scheme is used for compressing first CSI associated with a first layer used for wireless communication between the UE and the network entity via the cell.

FIG. 7 illustrates a block diagram 700 of a communications manager 720 that supports layer-specific accuracy for CSF in accordance with one or more aspects of the present disclosure. The communications manager 720 may be an example of aspects of a communications manager 520, a communications manager 620, or both, as described herein. The communications manager 720, or various components thereof, may be an example of means for performing various aspects of layer-specific accuracy for CSF as described herein. For example, the communications manager 720 may include a resource utilization component 725, a compression scheme component 730, a resource allocation component 735, a rank component 740, a feedback component 745, or any combination thereof. Each of these components may communicate, directly or indirectly, with one another (e.g., via one or more buses).

The communications manager 720 may support wireless communication at a UE in accordance with examples as disclosed herein. The resource utilization component 725 may be configured as or otherwise support a means for receiving first signaling from a network entity via a cell, the first signaling indicates a state of resource utilization associated with at least the cell. The compression scheme component 730 may be configured as or otherwise support a means for modifying a first compression scheme in accordance with the state of resource utilization, the first compression scheme is used for compressing first CSI associated with a first layer used for wireless communication between the UE and the network entity via the cell.

In some examples, the resource allocation component 735 may be configured as or otherwise support a means for receiving second signaling from the network entity via the cell, where the second signaling indicates an allocation of resources for transmission of a CSF message to the network entity, and where the allocation of resources is based on the state of resource utilization.

In some examples, the feedback component 745 may be configured as or otherwise support a means for transmitting the CSF message to the network entity using the allocation of resources, where the CSF message indicates a compression of the first CSI, and where an accuracy associated with the compression is based on modifying the first compression scheme.

In some examples, the compression scheme component 730 may be configured as or otherwise support a means for receiving second signaling from the network entity via the cell, where the second signaling identifies a neural network to be used with the first compression scheme, and where the neural network is associated with the state of resource utilization.

In some examples, to support modifying the first compression scheme in accordance with the state of resource utilization, the compression scheme component 730 may be configured as or otherwise support a means for modifying the first compression scheme to include use of the neural network for compressing the first CSI.

In some examples, the compression scheme component 730 may be configured as or otherwise support a means for transmitting second signaling to the network entity, the second signaling indicates that the UE modified the first compression scheme, a duration during which the UE modified the first compression scheme, or both. In some examples, the second signaling further indicates a neural network associated with the first compression scheme, the first layer, or both.

In some examples, the rank component 740 may be configured as or otherwise support a means for receiving second signaling from the network entity, the second signaling indicates a first rank associated with wireless communication between the UE and the network entity via the cell, where modifying the first compression scheme is based on the first rank, and where the first rank is different from a second rank requested by the UE for wireless communication between the UE and the network entity.

In some examples, the rank component 740 may be configured as or otherwise support a means for transmitting third signaling to the network entity in response to receiving the second signaling, the third signaling indicates a request to use a third rank for wireless communication between the UE and the network entity via the cell, where the third rank is based on the first rank.

In some examples, the compression scheme component 730 may be configured as or otherwise support a means for modifying a second compression scheme in accordance with the state of resource utilization, where the second compression scheme is used for compressing second CSI associated with a second layer used for wireless communication between the UE and the network entity via the cell, and where the first layer is associated with a first layer index and the second layer is associated with a second layer index that is greater than the first layer index.

In some examples, the first compression scheme is modified to use a first quantity of bits for compression of the first CSI and the second compression scheme is modified to use a second quantity of bits for compression of the second CSI. In some examples, the first quantity of bits is greater than the second quantity of bits. In some examples, a first accuracy associated with compression of the first CSI is greater than a second accuracy associated with compression of the second CSI based on the first quantity of bits being greater than the second quantity of bits.

In some examples, the first compression scheme is modified to use a first quantity of bits for compression of the first CSI and the second compression scheme is modified to use a second quantity of bits for compression of the second CSI. In some examples, the first quantity of bits less than the second quantity of bits. In some examples, a first accuracy associated with compression of the first CSI and a second accuracy associated with compression of the second CSI satisfy a threshold based on the first quantity of bits being less than the second quantity of bits.

FIG. 8 illustrates a diagram of a system 800 including a device 805 that supports layer-specific accuracy for CSF in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications man- ager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a proces- sor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi- directionally, via the one or more antennas 825, wired, or wireless links as described herein. For example, the trans- ceiver 815 may represent a wireless transceiver and may communicate bi-directionally with another wireless trans- ceiver. The transceiver 815 may also include a modem to modulate the packets, to provide the modulated packets to one or more antennas 825 for transmission, and to demodu- late packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the pro- cessor 840, cause the device 805 to perform various func- tions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or soft- ware operation such as the interaction with peripheral com- ponents or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting layer- specific accuracy for CSF). For example, the device 805 or a component of the device 805 may include a processor 840 and memory 830 coupled with or to the processor 840, the processor 840 and memory 830 configured to perform various functions described herein.

The communications manager 820 may support wireless communication at a UE (e.g., the device 805) in accordance with examples as disclosed herein. For example, the com- munications manager 820 may be configured as or otherwise support a means for receiving first signaling from a network entity via a cell, the first signaling indicates a state of resource utilization associated with at least the cell. The communications manager 820 may be configured as or otherwise support a means for modifying a first compression scheme in accordance with the state of resource utilization, the first compression scheme is used for compressing first CSI associated with a first layer used for wireless commu- nication between the UE and the network entity via the cell.

By including or configuring the communications manager 820 in accordance with examples as described herein, the device 805 may support techniques for improved commu- nication reliability, reduced latency, and more efficient uti- lization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of layer- specific accuracy for CSF as described herein, or the pro- cessor 840 and the memory 830 may be otherwise config- ured to perform or support such operations.

FIG. 9 illustrates a block diagram 900 of a device 905 that supports layer-specific accuracy for CSF in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, chan- nels associated with a protocol stack). Information may be passed on to other components of the device 905. In some examples, the receiver 910 may support obtaining informa- tion by receiving signals via one or more antennas. Addi- tionally, or alternatively, the receiver 910 may support obtaining information by receiving signals via one or more wired (e.g., electrical, fiber optic) interfaces, wireless inter- faces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of layer-specific accuracy for CSF as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity (e.g., the device 905) in accordance with examples as disclosed herein. For example, the communications manager 920 may be configured as or otherwise support a means for outputting first signaling via a cell that indicates a state of resource utilization associated with at least the cell. The communications manager 920 may be configured as or otherwise support a means for obtaining second signaling via the cell that indicates a first modification to a first compression scheme used for compressing first CSI associated with a first layer used for wireless communication via the cell, the first modification is based on the state of resource utilization.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources.

FIG. 10 illustrates a block diagram 1000 of a device 1005 that supports layer-specific accuracy for CSF in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of layer-specific accuracy for CSF as described herein. For example, the communications manager 1020 may include a resource utilization indication component 1025 a compression scheme indication component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity (e.g., the device 1005) in accordance with examples as disclosed herein. The resource utilization indication component 1025 may be configured as or otherwise support a means for outputting first signaling via a cell that indicates a state of resource utilization associated with at least the cell. The compression scheme indication component 1030 may be configured as or otherwise support a means for obtaining second signaling via the cell that indicates a first modification to a first compression scheme used for compressing first CSI associated with a first layer used for wireless communication via the cell, the first modification is based on the state of resource utilization.

FIG. 11 illustrates a block diagram 1100 of a communications manager 1120 that supports layer-specific accuracy for CSF in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of layer-specific accuracy for CSF as described herein. For example, the communications manager 1120 may include a resource utilization indication component 1125, a compression scheme indication component 1130, a resource allocation indication component 1135, a neural network indication component 1140, a rank indication component 1145, an CSF component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The resource utilization indication component 1125 may be configured as or otherwise support a means for outputting first signaling via a cell that indicates a state of resource utilization associated with at least the cell. The compression scheme indication component 1130 may be configured as or otherwise support a means for obtaining second signaling via the cell that indicates a first modification to a first compression scheme used for compressing first CSI associated with a first layer used for wireless communication via the cell, the first modification is based on the state of resource utilization.

In some examples, the resource allocation indication component 1135 may be configured as or otherwise support a means for outputting third signaling that indicates an allocation of resources for transmission of a CSF message to the network entity, where the allocation of resources is based on the state of resource utilization.

In some examples, the CSF component 1150 may be configured as or otherwise support a means for obtaining the CSF message using the allocation of resources, where the CSF message indicates a compression of the first CSI, and where an accuracy associated with the compression is based on the first modification.

In some examples, the neural network indication component 1140 may be configured as or otherwise support a means for outputting third signaling via the cell that identifies a neural network to be used with the first compression scheme, where the neural network is associated with the state of resource utilization. In some examples, the second signaling further indicates a duration during which the first modification to the first compression scheme occurred, a neural network associated with the first compression scheme, the first layer, or any combination thereof.

In some examples, the rank indication component 1145 may be configured as or otherwise support a means for outputting third signaling that indicates a first rank associated with wireless communication via the cell, where the first modification is based on the first rank. In some examples, the rank indication component 1145 may be configured as or otherwise support a means for obtaining fourth signaling in response to outputting the third signaling, where the fourth signaling indicates a request to use a second rank for wireless communication via the cell, and where the second rank is based on the first rank.

In some examples, the second signaling further indicates a second modification to a second compression scheme used for compressing second CSI associated with a second layer used for wireless communication via the cell. In some examples, the second modification is based on the state of resource utilization.

In some examples, the first modification identifies a first quantity of bits used for compression of the first CSI and the second modification identifies a second quantity of bits used for compression of the second CSI. In some examples, the first quantity of bits is greater than the second quantity of bits. In some examples, a first accuracy associated with compression of the first CSI is greater than a second accuracy associated with compression of the second CSI based on the first quantity of bits being greater than the second quantity of bits.

In some examples, the first modification identifies a first quantity of bits used for compression of the first CSI and the second modification identifies a second quantity of bits used for compression of the second CSI. In some examples, the first quantity of bits is less than the second quantity of bits. In some examples, a first accuracy associated with compression of the first CSI and a second accuracy associated with compression of the second CSI satisfy a threshold based on the first quantity of bits being less than the second quantity of bits.

In some examples, the resource utilization indication component 1125 may be configured as or otherwise support a means for determining the state of resource utilization based on an uplink resource block usage associated with at least the cell, a downlink resource block usage associated with at least the cell, or both.

FIG. 12 illustrates a diagram of a system 1200 including a device 1205 that supports layer-specific accuracy for CSF in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting layer-specific accuracy for CSF). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity (e.g., the device 1205) in accordance with examples as disclosed herein. For example, the communications manager 1220 may be configured as or otherwise support a means for outputting first signaling via a cell that indicates a state of resource utilization associated with at least the cell. The communications manager 1220 may be configured as or otherwise support a means for obtaining second signaling via the cell that indicates a first modification to a first compression scheme used for compressing first CSI associated with a first layer used for wireless communication via the cell, the first modification is based on the state of resource utilization.

By including or configuring the communications manager 1220 in accordance with examples as described herein, the device 1205 may support techniques for improved communication reliability, reduced latency, and more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of layer-specific accuracy for CSF as described herein, or the processor 1235 and the memory 1225 may be otherwise configured to perform or support such operations.

FIG. 13 illustrates a flowchart showing a method 1300 that supports layer-specific accuracy for CSF in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving first signaling from a network entity via a cell, the first signaling indicates a state of resource utilization associated with at least the cell. The operations of 1305 may be performed in accordance with examples as disclosed herein. In some examples, aspects of the operations of 1305 may be performed by a resource utilization component 725 as described with reference to FIG. 7.

At 1310, the method may include modifying a first compression scheme in accordance with the state of resource utilization, the first compression scheme is used for compressing first CSI associated with a first layer used for wireless communication between the UE and the network entity via the cell. The operations of 1310 may be performed in accordance with examples as disclosed herein. In some examples, aspects of the operations of 1310 may be performed by a compression scheme component 730 as described with reference to FIG. 7.

FIG. 14 illustrates a flowchart showing a method 1400 that supports layer-specific accuracy for CSF in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving first signaling from a network entity via a cell, the first signaling indicates a state of resource utilization associated with at least the cell. The operations of 1405 may be performed in accordance with examples as disclosed herein. In some examples, aspects of the operations of 1405 may be performed by a resource utilization component 725 as described with reference to FIG. 7.

At 1410, the method may include modifying a first compression scheme in accordance with the state of resource utilization, the first compression scheme is used for compressing first CSI associated with a first layer used for wireless communication between the UE and the network entity via the cell. The operations of 1410 may be performed in accordance with examples as disclosed herein. In some examples, aspects of the operations of 1410 may be performed by a compression scheme component 730 as described with reference to FIG. 7.

At 1415, the method may include receiving second signaling from the network entity via the cell, where the second signaling indicates an allocation of resources for transmission of a CSF message to the network entity, and where the allocation of resources is based on the state of resource utilization. The operations of 1415 may be performed in accordance with examples as disclosed herein. In some examples, aspects of the operations of 1415 may be performed by a resource allocation component 735 as described with reference to FIG. 7.

FIG. 15 illustrates a flowchart showing a method 1500 that supports layer-specific accuracy for CSF in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include outputting first signaling via a cell that indicates a state of resource utilization associated with at least the cell. The operations of 1505 may be performed in accordance with examples as disclosed herein. In some examples, aspects of the operations of 1505 may be performed by a resource utilization indication component 1125 as described with reference to FIG. 11.

At 1510, the method may include obtaining second signaling via the cell that indicates a first modification to a first compression scheme used for compressing first CSI associated with a first layer used for wireless communication via the cell, the first modification is based on the state of resource utilization. The operations of 1510 may be performed in accordance with examples as disclosed herein. In some examples, aspects of the operations of 1510 may be performed by a compression scheme indication component 1130 as described with reference to FIG. 11.

FIG. 16 illustrates a flowchart showing a method 1600 that supports layer-specific accuracy for CSF in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include outputting first signaling via a cell that indicates a state of resource utilization associated with at least the cell. The operations of 1605 may be performed in accordance with examples as disclosed herein. In some examples, aspects of the operations of 1605 may be performed by a resource utilization indication component 1125 as described with reference to FIG. 11.

At 1610, the method may include obtaining second signaling via the cell that indicates a first modification to a first compression scheme used for compressing first CSI associated with a first layer used for wireless communication via the cell, the first modification is based on the state of resource utilization. The operations of 1610 may be performed in accordance with examples as disclosed herein. In some examples, aspects of the operations of 1610 may be performed by a compression scheme indication component 1130 as described with reference to FIG. 11.

At 1615, the method may include outputting third signaling that indicates an allocation of resources for transmission of a CSF message to the network entity, where the allocation of resources is based on the state of resource utilization. The operations of 1615 may be performed in accordance with examples as disclosed herein. In some examples, aspects of the operations of 1615 may be performed by a resource allocation indication component 1135 as described with reference to FIG. 11.

The following provides an overview of aspects of the present disclosure:

Aspect 1: A method for wireless communication at a UE, comprising: receiving first signaling from a network entity via a cell, the first signaling indicates a state of resource utilization associated with at least the cell; and modifying a first compression scheme in accordance with the state of resource utilization, the first compression scheme is used for compressing first CSI associated with a first layer used for wireless communication between the UE and the network entity via the cell.

Aspect 2: The method of aspect 1, further comprising: receiving second signaling from the network entity via the cell, wherein the second signaling indicates an allocation of resources for transmission of a CSF message to the network entity, and wherein the allocation of resources is based at least in part on the state of resource utilization.

Aspect 3: The method of aspect 2, further comprising: transmitting the CSF message to the network entity using the allocation of resources, wherein the CSF message indicates a compression of the first CSI, and wherein an accuracy associated with the compression is based at least in part on modifying the first compression scheme.

Aspect 4: The method of any of aspects 1 through 3, further comprising: receiving second signaling from the network entity via the cell, wherein the second signaling identifies a neural network to be used with the first compression scheme, and wherein the neural network is associated with the state of resource utilization.

Aspect 5: The method of aspect 4, wherein modifying the first compression scheme in accordance with the state of resource utilization comprises: modifying the first compression scheme to include use of the neural network for compressing the first CSI.

Aspect 6: The method of any of aspects 1 through 5, further comprising: transmitting second signaling to the network entity, the second signaling indicates that the UE modified the first compression scheme, a duration during which the UE modified the first compression scheme, or both.

Aspect 7: The method of aspect 6, wherein the second signaling further indicates a neural network associated with the first compression scheme, the first layer, or both.

Aspect 8: The method of any of aspects 1 through 7, further comprising: receiving second signaling from the network entity, the second signaling indicates a first rank associated with wireless communication between the UE and the network entity via the cell, wherein modifying the first compression scheme is based at least in part on the first rank, and wherein the first rank is different from a second rank requested by the UE for wireless communication between the UE and the network entity.

Aspect 9: The method of aspect 8, further comprising: transmitting third signaling to the network entity in response to receiving the second signaling, the third signaling indicates a request to use a third rank for wireless communication between the UE and the network entity via the cell, wherein the third rank is based at least in part on the first rank.

Aspect 10: The method of any of aspects 1 through 9, further comprising: modifying a second compression scheme in accordance with the state of resource utilization, wherein the second compression scheme is used for compressing second CSI associated with a second layer used for wireless communication between the UE and the network entity via the cell, and wherein the first layer is associated with a first layer index and the second layer is associated with a second layer index that is greater than the first layer index.

Aspect 11: The method of aspect 10, wherein the first compression scheme is modified to use a first quantity of bits for compression of the first CSI and the second compression scheme is modified to use a second quantity of bits for compression of the second CSI, and the first quantity of bits is greater than the second quantity of bits.

Aspect 12: The method of aspect 11, wherein a first accuracy associated with compression of the first CSI is greater than a second accuracy associated with compression of the second CSI based at least in part on the first quantity of bits being greater than the second quantity of bits.

Aspect 13: The method of aspect 10, wherein the first compression scheme is modified to use a first quantity of bits for compression of the first CSI and the second compression scheme is modified to use a second quantity of bits for compression of the second CSI, and the first quantity of bits less than the second quantity of bits.

Aspect 14: The method of aspect 13, wherein a first accuracy associated with compression of the first CSI and a second accuracy associated with compression of the second CSI satisfy a threshold based at least in part on the first quantity of bits being less than the second quantity of bits.

Aspect 15: A method for wireless communication at a network entity, comprising: outputting first signaling via a cell that indicates a state of resource utilization associated with at least the cell; and obtaining second signaling via the cell that indicates a first modification to a first compression scheme used for compressing first CSI associated with a first layer used for wireless communication via the cell, the first modification is based at least in part on the state of resource utilization.

Aspect 16: The method of aspect 15, further comprising: outputting third signaling that indicates an allocation of resources for transmission of a CSF message to the network entity, wherein the allocation of resources is based at least in part on the state of resource utilization.

Aspect 17: The method of aspect 16, further comprising: obtaining the CSF message using the allocation of resources, wherein the CSF message indicates a compression of the first CSI, and wherein an accuracy associated with the compression is based at least in part on the first modification.

Aspect 18: The method of any of aspects 15 through 17, further comprising: outputting third signaling via the cell that identifies a neural network to be used with the first compression scheme, wherein the neural network is associated with the state of resource utilization.

Aspect 19: The method of any of aspects 15 through 18, wherein the second signaling further indicates a duration during which the first modification to the first compression scheme occurred, a neural network associated with the first compression scheme, the first layer, or any combination thereof.

Aspect 20: The method of any of aspects 15 through 19, further comprising: outputting third signaling that indicates a first rank associated with wireless communication via the cell, wherein the first modification is based at least in part on the first rank.

Aspect 21: The method of aspect 20, further comprising: obtaining fourth signaling in response to outputting the third signaling, wherein the fourth signaling indicates a request to use a second rank for wireless communication via the cell, and wherein the second rank is based at least in part on the first rank.

Aspect 22: The method of any of aspects 15 through 21, wherein the second signaling further indicates a second modification to a second compression scheme used for compressing second CSI associated with a second layer used for wireless communication via the cell, and the second modification is based at least in part on the state of resource utilization.

Aspect 23: The method of aspect 22, wherein the first modification identifies a first quantity of bits used for compression of the first CSI and the second modification identifies a second quantity of bits used for compression of the second CSI, and the first quantity of bits is greater than the second quantity of bits.

Aspect 24: The method of aspect 23, wherein a first accuracy associated with compression of the first CSI is greater than a second accuracy associated with compression of the second CSI based at least in part on the first quantity of bits being greater than the second quantity of bits.

Aspect 25: The method of aspect 22, wherein the first modification identifies a first quantity of bits used for compression of the first CSI and the second modification identifies a second quantity of bits used for compression of the second CSI, and the first quantity of bits is less than the second quantity of bits.

Aspect 26: The method of aspect 25, wherein a first accuracy associated with compression of the first CSI and a second accuracy associated with compression of the second CSI satisfy a threshold based at least in part on the first quantity of bits being less than the second quantity of bits.

Aspect 27: The method of any of aspects 15 through 26, further comprising: determining the state of resource utilization based at least in part on an uplink resource block usage associated with at least the cell, a downlink resource block usage associated with at least the cell, or both.

Aspect 28: A UE, comprising a processor; memory coupled with the processor; and instructions stored in the memory and executable by the processor to cause the UE to perform a method of any of aspects 1 through 14.

Aspect 29: A UE, comprising at least one means for performing a method of any of aspects 1 through 14.

Aspect 30: A non-transitory computer-readable medium storing code for wireless communication, the code comprising instructions executable by a processor to perform a method of any of aspects 1 through 14.

Aspect 31: A network entity, comprising a processor; memory coupled with the processor; and instructions stored in the memory and executable by the processor to cause the network entity to perform a method of any of aspects 15 through 27.

Aspect 32: A network entity, comprising at least one means for performing a method of any of aspects 15 through 27.

Aspect 33: A non-transitory computer-readable medium storing code for wireless communication at a network entity, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

a processor;

memory coupled with the processor; and instructions stored in the memory and executable by the processor to cause the UE to:

receive first signaling from a network entity via a cell, the first signaling indicates a state of resource utilization associated with at least the cell; and modify a first compression scheme in accordance with the state of resource utilization, the first compression scheme is used for compressing first channel state information associated with a first spatial layer in a multiple spatial layer wireless communication between the UE and the network entity via the cell, wherein the UE is configured to use at least the first compression scheme for compressing channel state information associated with the first spatial layer and a second compression scheme for compressing channel state information associated with a second spatial layer of the multiple spatial layers in accordance with the state of resource utilization, the first compression scheme being different from the second compression scheme in accordance with the first spatial layer corresponding to a higher energy relative to the second spatial layer.

2. The UE of claim 1, wherein the instructions are further executable by the processor to cause the UE to:

receive second signaling from the network entity via the cell, wherein the second signaling indicates an allocation of resources for transmission of a channel state feedback message to the network entity, and wherein the allocation of resources is based at least in part on the state of resource utilization.

3. The UE of claim 2, wherein the instructions are further executable by the processor to cause the UE to:

transmit the channel state feedback message to the network entity using the allocation of resources, wherein the channel state feedback message indicates a compression of the first channel state information, and wherein an accuracy associated with the compression is based at least in part on modifying the first compression scheme.

4. The UE of claim 1, wherein the instructions are further executable by the processor to cause the UE to:

receive second signaling from the network entity via the cell, wherein the second signaling identifies a neural network to be used with the first compression scheme, and wherein the neural network is associated with the state of resource utilization.

5. The UE of claim 4, wherein the instructions to modify the first compression scheme in accordance with the state of resource utilization are executable by the processor to cause the UE to:

modify the first compression scheme to include use of the neural network for compressing the first channel state information.

6. The UE of claim 1, wherein the instructions are further executable by the processor to cause the UE to:

transmit second signaling to the network entity, the second signaling indicates that the UE modified the first compression scheme, a duration during which the UE modified the first compression scheme, or both.

7. The UE of claim 6, wherein the second signaling further indicates a neural network associated with the first compression scheme, the first spatial layer, or both.

8. The UE of claim 1, wherein the instructions are further executable by the processor to cause the UE to:

receive second signaling from the network entity, the second signaling indicates a first rank associated with wireless communication between the UE and the network entity via the cell, wherein modifying the first compression scheme is based at least in part on the first rank, and wherein the first rank is different from a second rank requested by the UE for wireless communication between the UE and the network entity.

9. The UE of claim 8, wherein the instructions are further executable by the processor to cause the UE to:

transmit third signaling to the network entity in response to receiving the second signaling, the third signaling indicates a request to use a third rank for wireless communication between the UE and the network entity via the cell, wherein the third rank is based at least in part on the first rank.

10. The UE of claim 1, wherein the instructions are further executable by the processor to cause the UE to:

modify the second compression scheme in accordance with the state of resource utilization, wherein the second compression scheme is used for compressing second channel state information associated with the second spatial layer of the multiple spatial layers used for wireless communication between the UE and the network entity via the cell, and wherein the first spatial layer is associated with a first layer index and the second spatial layer is associated with a second layer index that is greater than the first layer index.

11. The UE of claim 10, wherein the first compression scheme is modified to use a first quantity of bits for compression of the first channel state information and the second compression scheme is modified to use a second quantity of bits for compression of the second channel state information, and wherein the first quantity of bits is greater than the second quantity of bits.

12. The UE of claim 11, wherein a first accuracy associated with compression of the first channel state information is greater than a second accuracy associated with compression of the second channel state information based at least in part on the first quantity of bits being greater than the second quantity of bits.

13. The UE of claim 10, wherein the first compression scheme is modified to use a first quantity of bits for compression of the first channel state information and the second compression scheme is modified to use a second quantity of bits for compression of the second channel state information, and wherein the first quantity of bits less than the second quantity of bits.

14. The UE of claim 13, wherein a first accuracy associated with compression of the first channel state information and a second accuracy associated with compression of the second channel state information satisfy a threshold based at least in part on the first quantity of bits being less than the second quantity of bits.

15. A network entity, comprising:

a processor;

memory coupled with the processor; and instructions stored in the memory and executable by the processor to cause the network entity to:

output first signaling via a cell that indicates a state of resource utilization associated with at least the cell; and obtain second signaling via the cell that indicates a first modification to a first compression scheme used for compressing first channel state information associated with a first spatial layer in a multiple spatial layer wireless communication via the cell, the first modification is based at least in part on the state of resource utilization, wherein the first compression scheme is used for compressing channel state information associated with the first spatial layer and a second compression scheme is used for compressing channel state information associated with a second spatial layer of the multiple spatial layers in accordance with the state of resource utilization, the first compression scheme being different from the second compression scheme in accordance with the first spatial layer corresponding to a higher energy relative to the second spatial layer.

16. The network entity of claim 15, wherein the instructions are further executable by the processor to cause the network entity to:

output third signaling that indicates an allocation of resources for transmission of a channel state feedback message to the network entity, wherein the allocation of resources is based at least in part on the state of resource utilization.

17. The network entity of claim 16, wherein the instructions are further executable by the processor to cause the network entity to:

obtain the channel state feedback message using the allocation of resources, wherein the channel state feedback message indicates a compression of the first channel state information, and wherein an accuracy associated with the compression is based at least in part on the first modification.

18. The network entity of claim 15, wherein the instructions are further executable by the processor to cause the network entity to:

output third signaling via the cell that identifies a neural network to be used with the first compression scheme, wherein the neural network is associated with the state of resource utilization.

19. The network entity of claim 15, wherein the second signaling further indicates a duration during which the first modification to the first compression scheme occurred, a neural network associated with the first compression scheme, the first spatial layer, or any combination thereof.

20. The network entity of claim 15, wherein the instructions are further executable by the processor to cause the network entity to:

output third signaling that indicates a first rank associated with wireless communication via the cell, wherein the first modification is based at least in part on the first rank.

21. The network entity of claim 20, wherein the instructions are further executable by the processor to cause the network entity to:

obtain fourth signaling in response to outputting the third signaling, wherein the fourth signaling indicates a request to use a second rank for wireless communication via the cell, and wherein the second rank is based at least in part on the first rank.

22. The network entity of claim 15, wherein the second signaling further indicates a second modification to a second compression scheme used for compressing second channel state information associated with the second spatial layer of the multiple spatial layers, and wherein the second modification is based at least in part on the state of resource utilization.

23. The network entity of claim 22, wherein the first modification identifies a first quantity of bits used for compression of the first channel state information and the second modification identifies a second quantity of bits used for compression of the second channel state information, and the first quantity of bits is greater than the second quantity of bits.

24. The network entity of claim 23, wherein a first accuracy associated with compression of the first channel state information is greater than a second accuracy associated with compression of the second channel state information based at least in part on the first quantity of bits being greater than the second quantity of bits.

25. The network entity of claim 22, wherein the first modification identifies a first quantity of bits used for compression of the first channel state information and the second modification identifies a second quantity of bits used for compression of the second channel state information, and wherein the first quantity of bits is less than the second quantity of bits.

26. The network entity of claim 25, wherein a first accuracy associated with compression of the first channel state information and a second accuracy associated with compression of the second channel state information satisfy a threshold based at least in part on the first quantity of bits being less than the second quantity of bits.

27. The network entity of claim 15, wherein the instructions are further executable by the processor to cause the network entity to:

determine the state of resource utilization based at least in part on an uplink resource block usage associated with at least the cell, a downlink resource block usage associated with at least the cell, or both.

28. A method for wireless communication at a user equipment (UE), comprising:

receiving first signaling from a network entity via a cell, the first signaling indicates a state of resource utilization associated with at least the cell; and modifying a first compression scheme in accordance with the state of resource utilization, the first compression scheme is used for compressing first channel state information associated with a first spatial layer in a multiple spatial layer wireless communication between the UE and the network entity via the cell, wherein the UE is configured to use at least the first compression scheme for compressing channel state information associated with the first spatial layer and a second compression scheme for compressing channel state information associated with a second spatial layer of the multiple spatial layers in accordance with the state of resource utilization, the first compression scheme being different from the second compression scheme in accordance with the first spatial layer corresponding to a higher energy relative to the second spatial layer.

29. The method of claim 28, further comprising:

receiving second signaling from the network entity via the cell, wherein the second signaling indicates an allocation of resources for transmission of a channel state feedback message to the network entity, and wherein the allocation of resources is based at least in part on the state of resource utilization.

30. A method for wireless communication at a network entity, comprising:

outputting first signaling via a cell that indicates a state of resource utilization associated with at least the cell; and obtaining second signaling via the cell that indicates a first modification to a first compression scheme used for compressing first channel state information associated with a first spatial layer in a multiple spatial layer wireless communication via the cell, the first modification is based at least in part on the state of resource utilization, wherein the first compression scheme is used for compressing channel state information associated with the first spatial layer and a second compression scheme is used for compressing channel state information associated with a second spatial layer of the multiple spatial layers in accordance with the state of resource utilization, the first compression scheme being different from the second compression scheme in accordance with the first spatial layer corresponding to a higher energy relative to the second spatial layer.

* * * * *